(12) United States Patent
Rafael Marques Lima et al.

(10) Patent No.: US 12,684,607 B2
(45) Date of Patent: Jul. 14, 2026

(54) METHOD AND SYSTEM FOR USER EQUIPMENT PAIRING IN FULL DUPLEX NETWORKS BASED ON MACHINE LEARNING

(71) Applicant: Telefonaktiebolaget LM Ericsson (publ), Stockholm (SE)

(72) Inventors: Francisco Rafael Marques Lima, Sobral (BR); Victor Farias Monteiro, Fortaleza (BR); Tarcisio Ferreira Maciel, Fortaleza (BR); João Rafael Barbosa de Araújo, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 681 days.

(21) Appl. No.: 18/014,584

(22) PCT Filed: Jun. 30, 2021

(86) PCT No.: PCT/IB2021/055883
§ 371 (c)(1),
(2) Date: Jan. 5, 2023

(87) PCT Pub. No.: WO2022/013665
PCT Pub. Date: Jan. 20, 2022

(65) Prior Publication Data
US 2023/0309133 A1 Sep. 28, 2023

Related U.S. Application Data

(60) Provisional application No. 63/052,652, filed on Jul. 16, 2020.

(51) Int. Cl.
*H04W 72/23* (2023.01)
*G06N 20/00* (2019.01)
(Continued)

(52) U.S. Cl.
CPC .......... *H04W 72/541* (2023.01); *G06N 20/00* (2019.01); *H04L 5/0037* (2013.01);
(Continued)

(58) Field of Classification Search
None
See application file for complete search history.

(56) References Cited

U.S. PATENT DOCUMENTS 9,420,606 B2 8/2016 Bhushan et al.
9,504,048 B2 11/2016 Cheng et al.
(Continued)

FOREIGN PATENT DOCUMENTS

WO 2017/188918 A1 11/2017
WO 2017/222511 A1 12/2017

OTHER PUBLICATIONS

Araujo et al., "Leveraging Reinforcement Learning for User Pairing in Full Duplex Networks", XXXVIII Brazilian Telecommunication and Signal Processing Symposium, Nov. 22-25, 2020, 5 pages.
(Continued)

*Primary Examiner* — Abdelillah Elmejjarmi

(74) *Attorney, Agent, or Firm* — NICHOLSON DE VOS WEBSTER & ELLIOTT LLP

(57) ABSTRACT

Method and system for enabling user equipment pairing for duplex communication networks based on machine learning. Based on a reinforcement learning mechanism, an uplink user equipment (UE) and a downlink UE are determined from a plurality of UEs for transmitting and receiving data at a first transmission time interval and in a first frequency channel. The base station transmits to the uplink UE a first scheduling grant and first configuration information and transmits to the downlink UE a second scheduling grant and second configuration information.

18 Claims, 10 Drawing Sheets

(51) Int. Cl.

| | |
|---|---|
| *H04L 5/00* | (2006.01) |
| *H04L 5/14* | (2006.01) |
| *H04W 72/1263* | (2023.01) |
| *H04W 72/541* | (2023.01) |

(52) U.S. Cl.
CPC ........... *H04L 5/14* (2013.01); *H04W 72/1263* (2013.01); *H04W 72/23* (2023.01)

(56) References Cited

U.S. PATENT DOCUMENTS

| | | | |
|---|---|---|---|
| 10,256,864 | B2 | 4/2019 | Eltawil et al. |
| 2009/0298523 | A1* | 12/2009 | Ogawa ................. H04W 72/04 455/509 |
| 2014/0169234 | A1 | 6/2014 | Zhu et al. |
| 2015/0055515 | A1 | 2/2015 | Cheng et al. |
| 2017/0054544 | A1 | 2/2017 | Kazmi et al. |
| 2017/0171761 | A1 | 6/2017 | Guvenc |
| 2017/0257184 | A1 | 9/2017 | Stirling-Gallacher et al. |
| 2018/0020364 | A1* | 1/2018 | Wu ...................... H04B 17/364 |
| 2018/0167832 | A1 | 6/2018 | Fang et al. |
| 2018/0292792 | A1* | 10/2018 | Ikai ...................... G05B 13/042 |
| 2019/0253117 | A1 | 8/2019 | Raghavan et al. |
| 2020/0119890 | A1* | 4/2020 | Yeh ........................... H04L 5/14 |
| 2023/0063040 | A1* | 3/2023 | Korpi ................... H04W 24/02 |

OTHER PUBLICATIONS

Ren et al., "A Distributed Link Scheduler for In-Band Full Duplex Wireless Networks", IEEE Transactions on Vehicular Technology, vol. 69, No. 5, May 2020, pp. 5255-5267.

* cited by examiner

Figure 1:
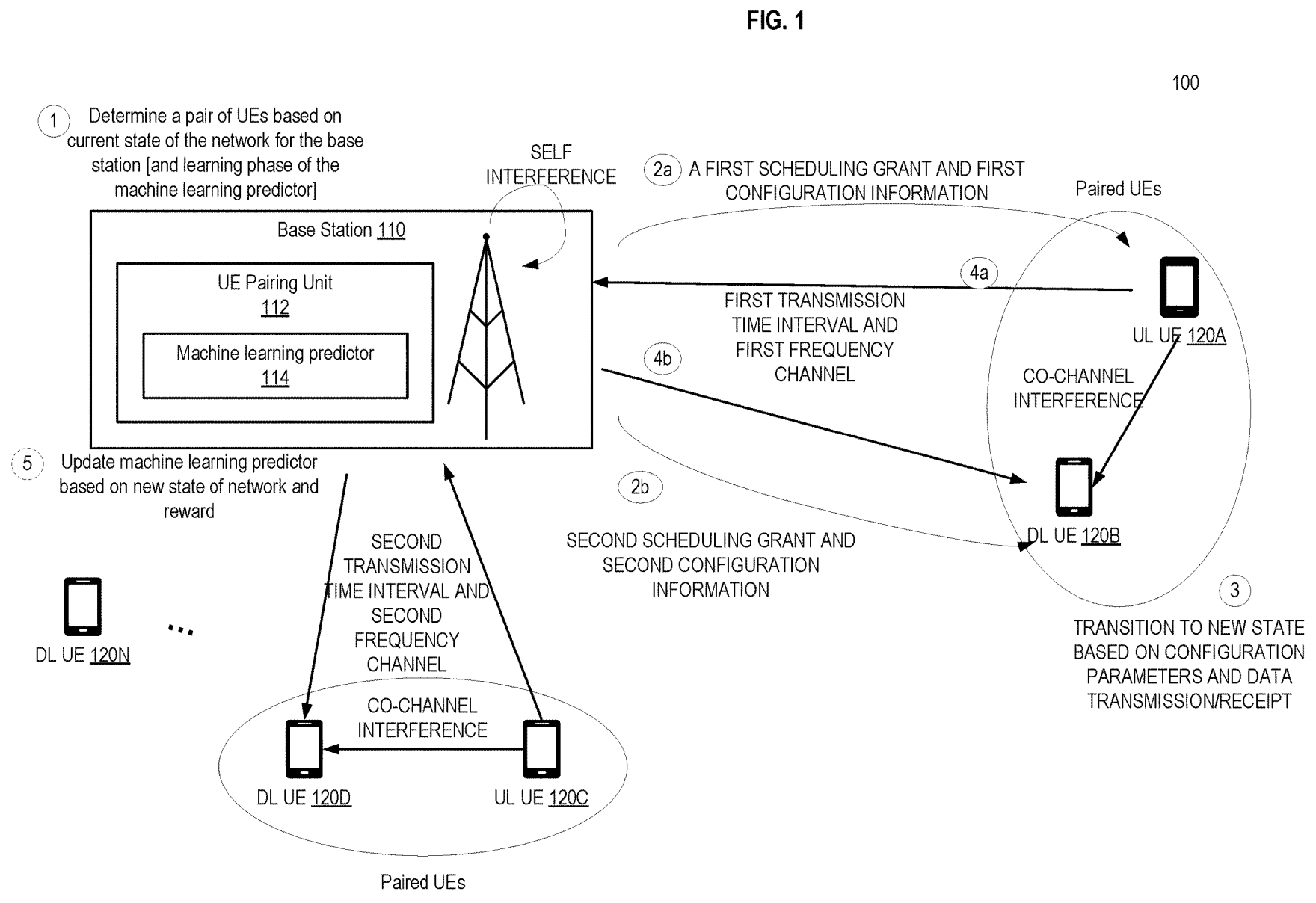

Paired UEs

UL UE 120A

CO-CHANNEL INTERFERENCE

DL UE 120B

③ TRANSITION TO NEW STATE BASED ON CONFIGURATION PARAMETERS AND DATA TRANSMISSION/RECEIPT

② A FIRST SCHEDULING GRANT AND FIRST CONFIGURATION INFORMATION

④ FIRST TRANSMISSION TIME INTERVAL AND FIRST FREQUENCY CHANNEL

④ SECOND SCHEDULING GRANT AND SECOND CONFIGURATION INFORMATION

SELF INTERFERENCE

Base Station 110

UE Pairing Unit 112

Machine learning predictor 114

① Determine a pair of UEs based on current state of the network for the base station [and learning phase of the machine learning predictor]

⑤ Update machine learning predictor based on new state of network and reward

SECOND TRANSMISSION TIME INTERVAL AND SECOND FREQUENCY CHANNEL

CO-CHANNEL INTERFERENCE

UL UE 120C

DL UE 120D

Paired UEs

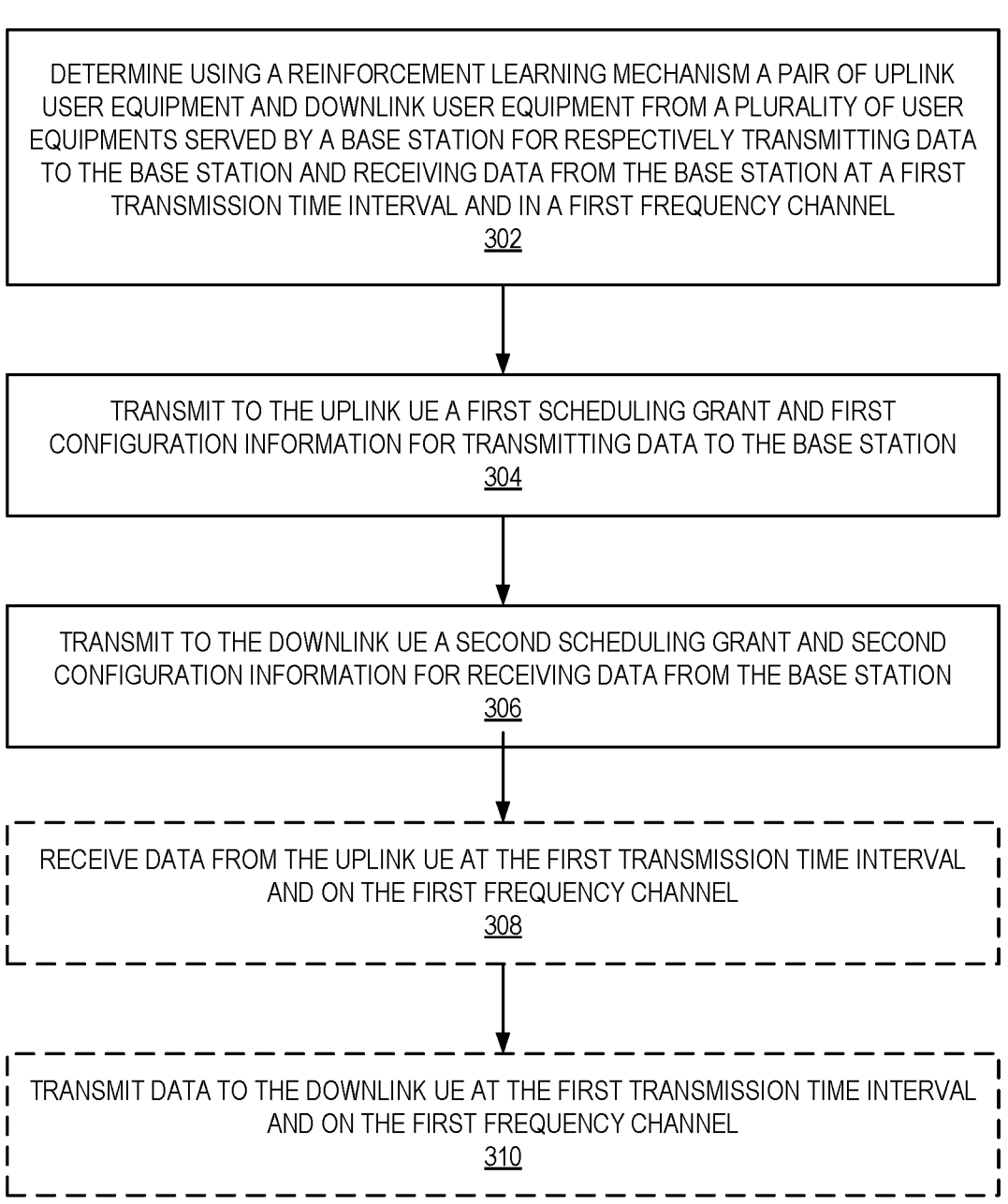

DETERMINE USING A REINFORCEMENT LEARNING MECHANISM A PAIR OF UPLINK USER EQUIPMENT AND DOWNLINK USER EQUIPMENT FROM A PLURALITY OF USER EQUIPMENTS SERVED BY A BASE STATION FOR RESPECTIVELY TRANSMITTING DATA TO THE BASE STATION AND RECEIVING DATA FROM THE BASE STATION AT A FIRST TRANSMISSION TIME INTERVAL AND IN A FIRST FREQUENCY CHANNEL
302

TRANSMIT TO THE UPLINK UE A FIRST SCHEDULING GRANT AND FIRST CONFIGURATION INFORMATION FOR TRANSMITTING DATA TO THE BASE STATION
304

TRANSMIT TO THE DOWNLINK UE A SECOND SCHEDULING GRANT AND SECOND CONFIGURATION INFORMATION FOR RECEIVING DATA FROM THE BASE STATION
306

RECEIVE DATA FROM THE UPLINK UE AT THE FIRST TRANSMISSION TIME INTERVAL AND ON THE FIRST FREQUENCY CHANNEL
308

TRANSMIT DATA TO THE DOWNLINK UE AT THE FIRST TRANSMISSION TIME INTERVAL AND ON THE FIRST FREQUENCY CHANNEL
310

FIG. 3B

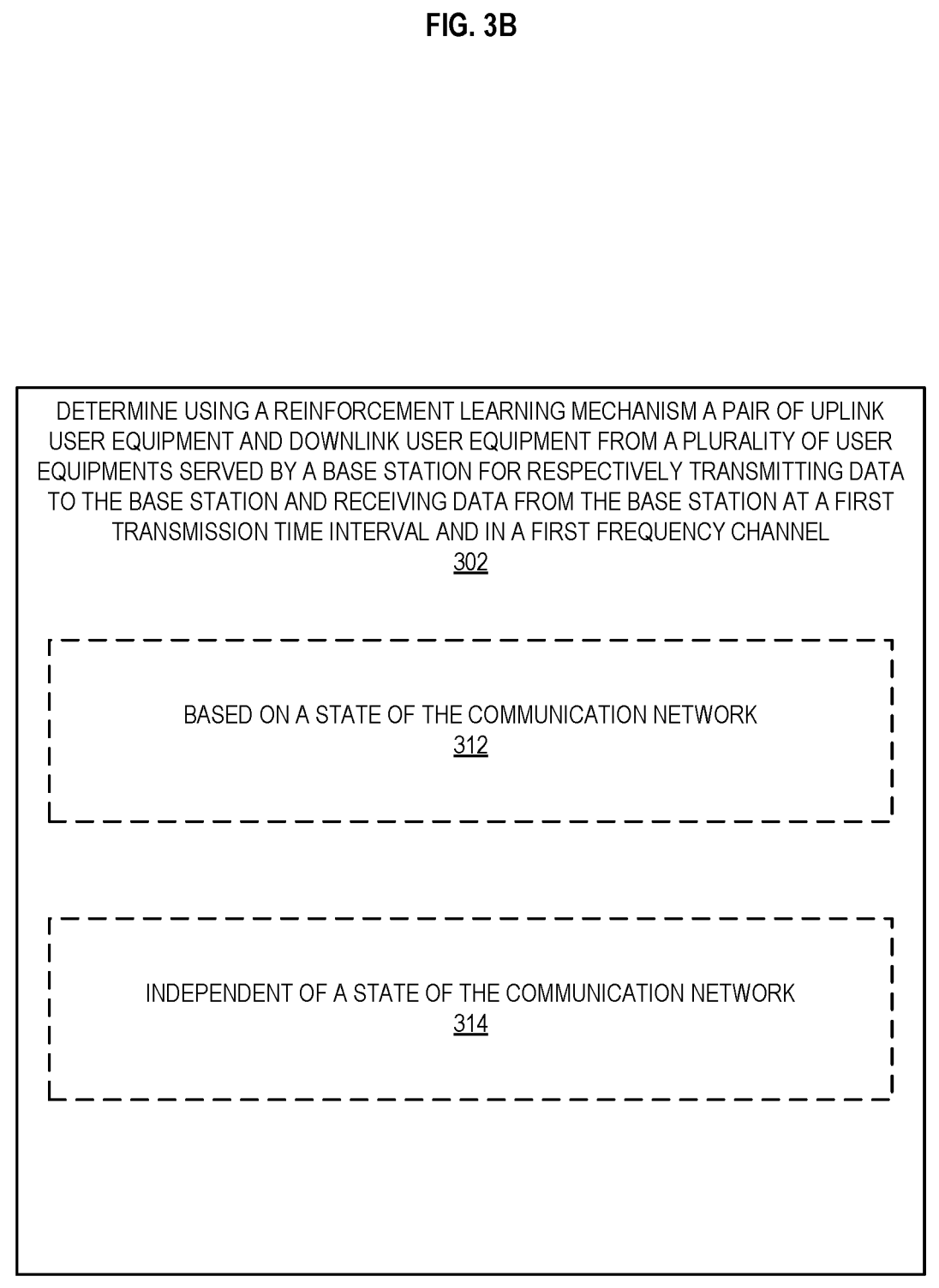

DETERMINE USING A REINFORCEMENT LEARNING MECHANISM A PAIR OF UPLINK USER EQUIPMENT AND DOWNLINK USER EQUIPMENT FROM A PLURALITY OF USER EQUIPMENTS SERVED BY A BASE STATION FOR RESPECTIVELY TRANSMITTING DATA TO THE BASE STATION AND RECEIVING DATA FROM THE BASE STATION AT A FIRST TRANSMISSION TIME INTERVAL AND IN A FIRST FREQUENCY CHANNEL
302

BASED ON A STATE OF THE COMMUNICATION NETWORK
312

INDEPENDENT OF A STATE OF THE COMMUNICATION NETWORK
314

FIG. 3C

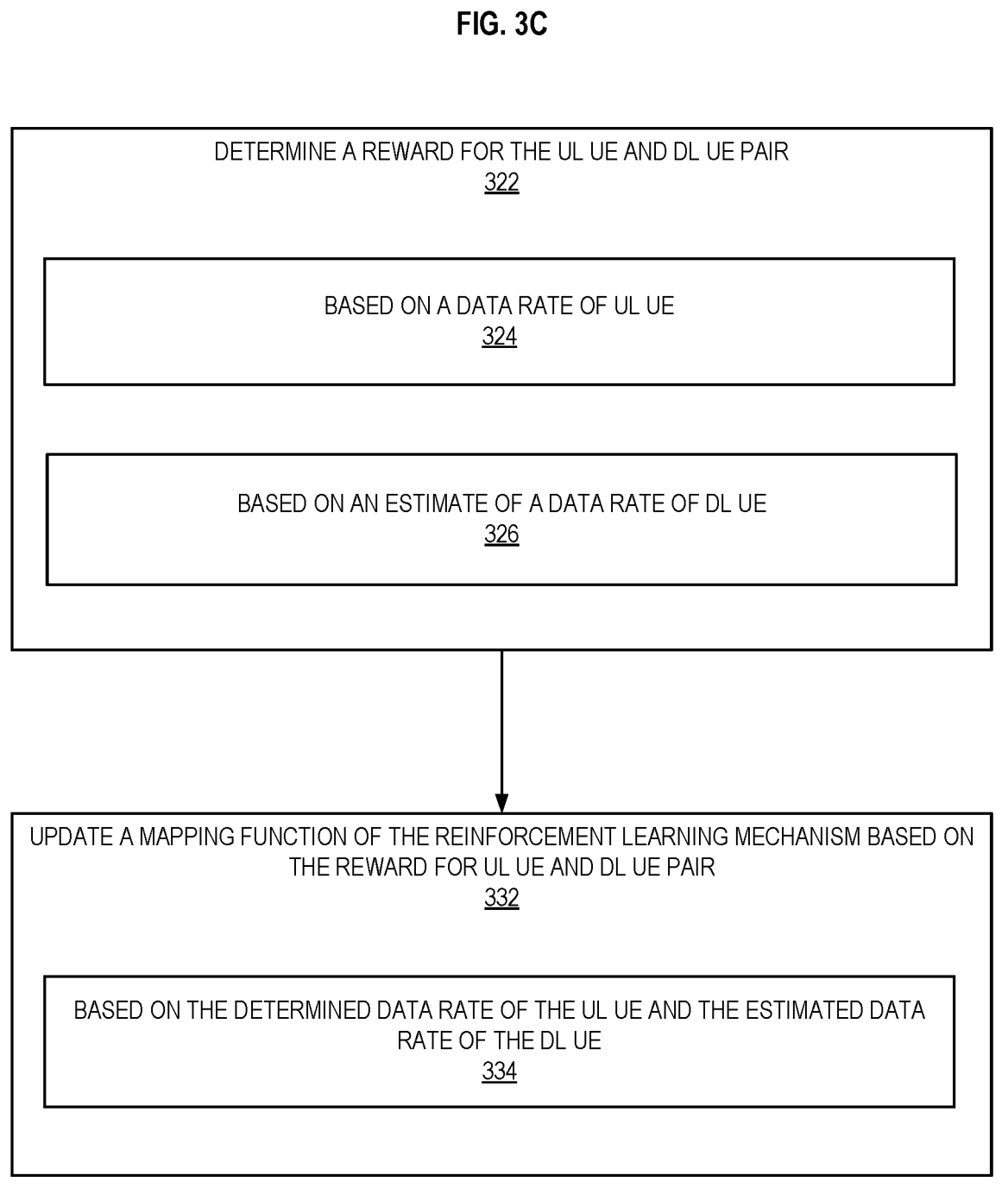

DETERMINE A REWARD FOR THE UL UE AND DL UE PAIR
322

BASED ON A DATA RATE OF UL UE
324

BASED ON AN ESTIMATE OF A DATA RATE OF DL UE
326

UPDATE A MAPPING FUNCTION OF THE REINFORCEMENT LEARNING MECHANISM BASED ON THE REWARD FOR UL UE AND DL UE PAIR
332

BASED ON THE DETERMINED DATA RATE OF THE UL UE AND THE ESTIMATED DATA RATE OF THE DL UE
334

Fig. 5

METHOD AND SYSTEM FOR USER EQUIPMENT PAIRING IN FULL DUPLEX NETWORKS BASED ON MACHINE LEARNING

CROSS-REFERENCE TO RELATED APPLICATIONS

This application is a National stage of International Application No. PCT/IB2021/055883, filed Jun. 30, 2021, which claims the benefit of U.S. Provisional Application No. 63/052,652, filed Jul. 16, 2020, which is are hereby incorporated by reference.

TECHNICAL FIELD

Embodiments of the invention relate to the field of wireless communication networking; and more specifically, to enabling user equipment pairing in full duplex networks based on machine learning.

BACKGROUND ART

The mobile communication sector is in constant evolution and is one of the most important industries as it is directly related to the development of several other businesses. However, mobile traffic in mobile networks increases at a rapid pace. In order to cope with the increased demand on the mobile networks, both as an increase in the number of subscriptions and mobile data traffic, more frequency bands should be available in order to improve system capacity. Unfortunately, the release of new frequency bands or the re-assignment of frequency bands from legacy networks (2G, 3G, 4G) to new radio access technologies is a slow and intricate process in nationwide and worldwide scopes.

Duplex communication technology is developed as a mechanism to increase the capacity of the mobile network through an efficient use of spectrum resources. Duplex communications have been conventionally provided in wireless communication networks by means of frequency division duplexing (FDD) and time division duplexing (TDD). In FDD, the total available frequency band is split into two parts where one is used for downlink (DL) communication, i.e., transmissions from the base station to user equipments (UEs), and the other is used for uplink (UL) communication, i.e., transmissions from UEs to the base station. On the other hand, in TDD, although the same frequency band is used for DL and UL transmissions, these transmissions take place at different time intervals.

FDD and TDD methods prevent a drawback in wireless communication networks in which a transceiver cannot properly decode a received signal in a given frequency channel if the transceiver is also transmitting on the same frequency channel at the same time. In this case, the transmitted signal, also called self-interference (SI), acts as a strong interfering source to the received signal. However, recent breakthroughs in hardware and signal processing have enabled the attenuation of SI by 100 dB. For example, specific antenna arrangements as well as signal processing in both analog and digital domains were used to attenuate SI. These recent breakthroughs have enabled full duplex (FD) communication, i.e., transmitting and receiving data at the same time and on the same frequency channel.

Interestingly, full duplex spectral efficiency gains can be obtained in point to multipoint communications even when only the base station is full duplex-capable while UEs operate in half duplex mode. In this mode of operation, the full duplex-capable base station can transmit to a given UE, called here as downlink (DL) UE, while it can receive a signal from another UE, called here as uplink (UL) UE. This is an appealing scenario since one can keep cost-effective hardware and processing capabilities on the UEs' side. However, besides SI that should be mitigated at the base station, the UL UE acts as an interference source to the link between the base station and DL UE. This interfering signal is called here co-channel interference (CCI).

SUMMARY

One general aspect includes a method in a base station (BS) that includes determining using a reinforcement learning mechanism a pair of uplink user equipment (UL UE) and downlink (DL) UE from a plurality of UEs for respectively transmitting data to the BS and receiving data from the BS at a first transmission time interval and in a first frequency channel; transmitting to the UL UE a first scheduling grant and first configuration information for transmitting data to the BS, and transmitting to the DL UE a second scheduling grant and second configuration information for receiving data from the BS.

One general aspect includes a machine-readable medium that includes computer program code which when executed by a computer carries out the following operations: determining using a reinforcement learning mechanism a pair of uplink user equipment (UL UE) and downlink (DL) UE from a plurality of UEs for respectively transmitting data to the BS and receiving data from the BS at a first transmission time interval and in a first frequency channel; transmitting to the UL UE a first scheduling grant and first configuration information for transmitting data to the BS, and transmitting to the DL UE a second scheduling grant and second configuration information for receiving data from the BS.

One general aspect includes a base station (BS). The base station includes a non-transitory machine-readable storage medium that provides instructions that, if executed by a processor, will cause the BS to perform operations including determining using a reinforcement learning mechanism a pair of uplink user equipment (UL UE) and downlink (DL) UE from a plurality of UEs for respectively transmitting data to the BS and receiving data from the BS at a first transmission time interval and in a first frequency channel, transmitting to the UL UE a first scheduling grant and first configuration information for transmitting data to the BS, and transmitting to the DL UE a second scheduling grant and second configuration information for receiving data from the BS.

BRIEF DESCRIPTION OF THE DRAWINGS

The invention may best be understood by referring to the following description and accompanying drawings that are used to illustrate embodiments of the invention. In the drawings:

FIG. 1 illustrates a block diagram of an exemplary system for enabling user equipment pairing in full duplex networks based on machine learning, in accordance with some embodiments.

FIG. 3A illustrates a flow diagram of exemplary operations performed for enabling user equipment pairing in full duplex networks using a reinforcement learning mechanism, in accordance with some embodiments.

FIG. 3B illustrates a flow diagram of exemplary operations performed for determining a pair of uplink UE and downlink UE, in accordance with some embodiments.

FIG. 3C illustrates a flow diagram of exemplary operations performed for updating a mapping function of the reinforcement learning mechanism, in accordance with some embodiments.

FIG. 5 illustrates an exemplary implementation of network devices, in accordance with some embodiments.

DETAILED DESCRIPTION

Figure 2A:
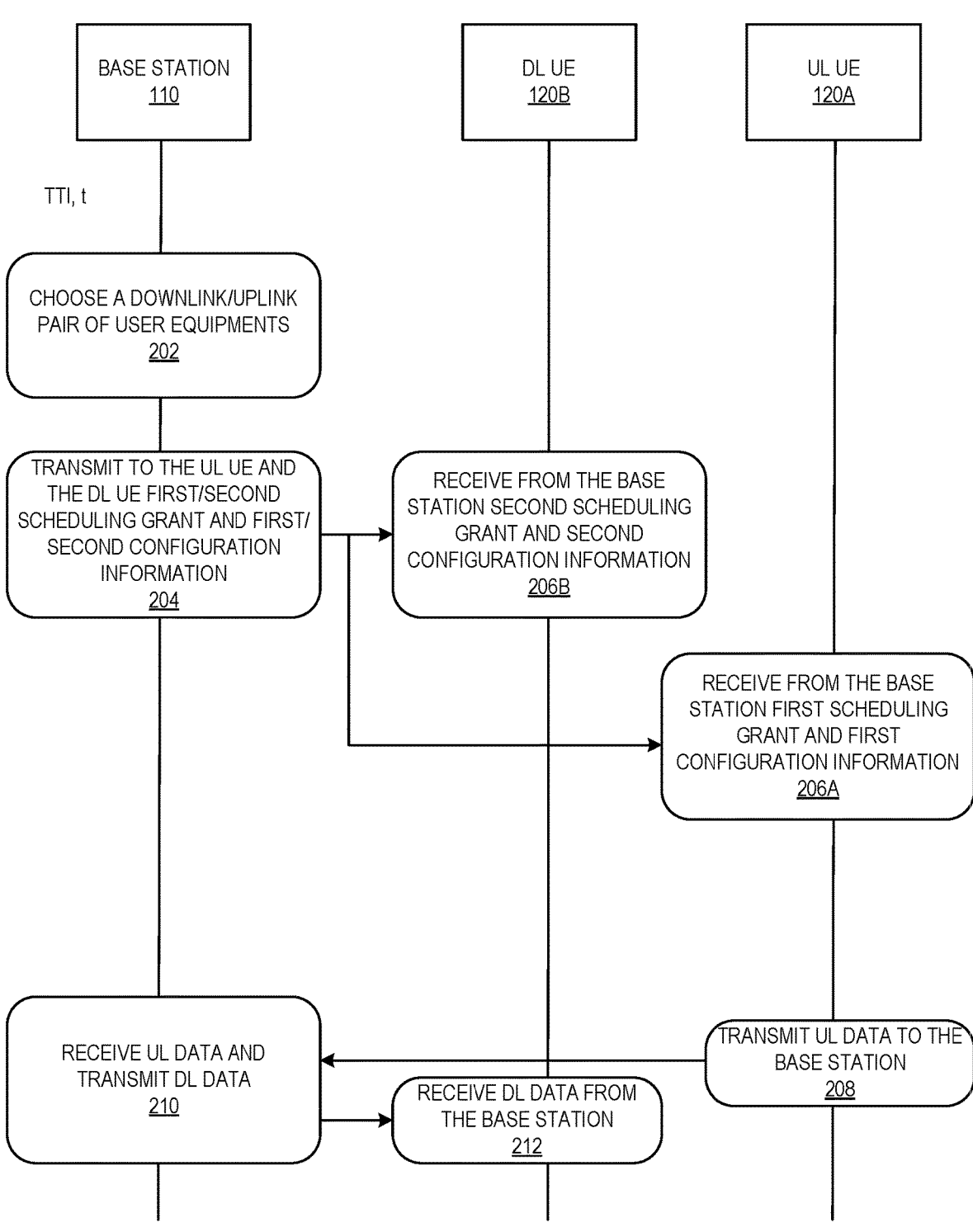
FIG. 2A illustrates a block diagram of exemplary operations performed between a base station and user equipments for full duplex network communication, in accordance with some embodiments.

The following description describes methods and apparatus for enabling user equipment pairing in full duplex networks based on machine learning. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To enable full duplex communication in a network, a base station selects an UL UE and a DL UE. This task of pair selection is referred to as UE pairing. Two scenarios can be considered for UE pairing in a point-to-multipoint scenario in a full duplex communication network. In a first scenario, the base station chooses as the UE pair a first UE, DL UE 1, and a second UE, UL UE 1, that are geographically close to one another (i.e., within a short distance of one another). In a second scenario, the selected UE pair, DL UE 2 and UL UE 2, are geographically far from one another (i.e., the distance between DL UE 2 and UL UE 2 is greater than the distance between DL UE 1 and UL UE 1). In the first scenario, DL UE 1 will suffer from high CCI from UL UE 2 due to the short distance between these two nodes. As a consequence, the experienced signal to interference plus noise ratio (SINR) will be low leading to poor transmit data rates. On the other hand, in the second scenario, DL UE 2 and UL UE 2 are more distant from each other leading to a higher path loss. In this case, the DL UE 2 will perceive a much lower CCI, and the SINR tends to be greater than in the first scenario.

Attenuation of the CCI signal is performed to improve the quality and efficiency of full duplex networks. CCI can be attenuated by a suitable choice of DL and UL UEs as well as by adequate control of UL transmit power and selection of a modulation and coding scheme (MCS). As discussed above, the pairing of DL and UL UEs that have a greater distance between one another strongly attenuates CCI by the increased path loss.

The embodiments described herein present a method and system for enabling UE pairing in a full duplex communication network. In one embodiment, a machine learning predictor of a base station is used to perform UE pairing in which an UL UE and a DL UE are selected to, respectively, transmit and receive data during the same transmission time interval and on the same frequency channel. The selected DL and UL UEs are configured to perform reception and transmission, respectively. In some embodiments, the base station receives from the UEs reports related to the data transmission, e.g., acknowledgement/negative-acknowledgement (ACK/NACK) hybrid automatic repeat request (HARQ) information from the DL UE, and may update the machine learning predictor based on the received data.

In the embodiments discussed herein, machine learning algorithms running on the base station are leveraged to learn and define a suitable UE pairing in full duplex communication based on configured system objectives or key performance indicators (KPIs) that can be related to spectral efficiency, user satisfaction, fairness, among others.

The embodiments described herein take advantage of existing control plane signaling between the base station and UEs in mobile communications networks (such as long-term evolution (LTE) and new radio (NR) networks) to train and/or update the machine learning algorithm used for selection of the UE pair. As an example, the effective transmitted and received data rate, i.e., without errors, for a selected UE pair can be fed to the machine learning algorithm. In some embodiments, this information can be estimated based on HARQ ACK/NACK messages received at the base station. Other types of information can be provided to the machine learning algorithm such as transmit buffer status, quality of service (QoS) requirements, BS's SI cancelling capability, UE battery state, among others. In some embodiments, the machine learning algorithm runs on the base station. The base station is responsible for deciding and informing the selected UE pair by means of scheduling grants as well as sending transmission/reception configuration parameters to the involved UEs.

The embodiments presented herein present several advantages when compared with existing approaches of enabling full duplex communication networks. For example, in a first existing approach, the system that is considered includes two-nodes with full duplex capabilities. The mechanism enables the acquisition of channel responses of SI channel in a full duplex communication. In particular, an interval with stable frequency domain response is determined for each channel at first, and then a random frequency point or a frequency point with a relatively significant channel response is selected from the interval with stable frequency domain response of each channel, as a transmission frequency point for a reference signal, and after an interrelation between channel responses at the transmission frequency point and at a non-transmission frequency point is acquired, channel responses in all time domain and frequency domain are obtained according to received signals corresponding to the reference signal at the transmission frequency point. In another approach, cancellation of the SI of a full duplex transceiver is performed. This second approach relies on an all-digital self-interference cancellation technique for full-duplex systems to suppress self-interference signals.

Other approaches address the case of point to multipoint full duplex networks. In a third approach, channel state information (CSI) reports are transmitted from full-duplex-capable UEs to the base station. The CSI reports can be used by the base station to support decisions on transmission mode, i.e., half duplex or full duplex mode, as well as MCS and UL transmit power. UEs can report CSI related to half duplex or full duplex modes depending on some conditions or demands from the base station. In a fourth approach, a method to set UEs in half duplex or full duplex modes based on the report of CSI and UE's SI canceling capacity is proposed. For example, the UE itself can suggest a transmission mode to the base station based on its SI received signal and SI canceling capability. In a fifth approach, a network with full-duplex capable base station and UEs is assumed. In this approach, based on CSI reported from the DL UE, the base station can define the transmission mode and set a new MCS to be used by both DL and UL UEs in the full duplex transmission with the base station. In all of these approaches no details about how DL and UL UEs can be chosen are provided.

Some other approaches for enabling a full duplex communication network consider SI and inter UE interference as well as UE pairing. For example, in one approach based on interference measurements reported by UEs, the base station can determine which pairs of UEs are more suitable for engaging in full duplex transmissions. UEs may use short distance communications, e.g., Wi-Fi, Bluetooth, to discover the neighbor UEs and report this information to the base station. In another approach, where a full duplex base station and half duplex UEs take part in a point-to-multipoint full duplex communication, a base station may choose UEs to be co-scheduled based, for example, on a path loss between the respective UEs. Several methods are proposed to estimate inter-UE path loss. In one example, path loss between UEs may be estimated through the use of pilot signals transmitted by, for example, half of the UEs on specific frequency resources determined by the base station in a discovery time slot. In another example, the path loss is estimated based on geographical position obtained by, e.g., GPS, and fed-back to the base station that in its turn evaluates the inter-UE distance. In another approach the UE estimates a list of neighbor UEs. Each UE reports its neighbor list to the base station that builds a master neighbor list and, based on that, can take scheduling decisions in full duplex networks. Alternatively, the neighbor list can be determined based on the geographical position of each UE. In all these existing approaches, to support UEs pairing the UEs need to provide the base station with information by means of messages in control channels, such as inter-UE path loss, geographical location, or neighbor lists. Furthermore, in some of these approaches, the UEs need to transmit reference signals towards other UEs in order to estimate other UEs' CCI, thus consuming precious radio resources.

Thus, the existing approaches either 1) do not provide any details on how DL and UL UEs are chosen (i.e., no methodology for pairing the UE is presented); or 2) in order to perform UE pairing, the base stations need to receive information such as UEs' geographical positions, path loss between UEs, or UE neighbor lists requiring reference signals or pilot signals to be transmitted resulting in precious time/frequency resources being occupied for channel estimation instead of being used for transmitting data. In contrast to these existing approaches, the embodiments described herein present an advantageous UE pairing mechanism for full duplex communication. The embodiments herein do not require additional reports from the UEs to the base station with information related to the UE-UE link. In addition, in some embodiments, standard messages and protocols are leveraged to support the UE pairing decision. As the solution described herein takes advantage of machine learning algorithms, it is able to adapt to different scenarios without the need of analytical models specific of a given scenario. Further, the proposed solution can be implemented in different 3GPP mobile networks such as LTE and NR with no or some minor changes. The proposed solution does not require a change in the control plane structure of the communication network since it relies on existing control messages to feed the machine learning algorithm. The embodiments herein cause less information to be reported when compared with the pre-existing pairing mechanisms, which results in a lower UE battery consumption.

FIG. 1 illustrates a block diagram of a network in which duplex communication is enabled by a pairing of UEs based on machine learning prediction, in accordance with some embodiments. The network 100 includes an exemplary base station (BS) 110 that is communicatively coupled with one or more UEs 120A-N. The exemplary network 100 is a point-to-multipoint wireless network illustrated with a single-cell. While the exemplary network includes a single cell, in other embodiments, a wireless communication network may include several cells (e.g., hundreds, thousands, etc.).

A BS 110 has full duplex capabilities, i.e., BS 110 is operative to transmit and receive data on the same frequency channel and during the same transmission time interval (TTI) to two different UEs. Thus, BS 110 is capable of transmitting information and data to a UE, hereby defined as Downlink (DL) UE, and receiving information from another UE, hereby defined as Uplink (UL) UE during the same TTI and at the same frequency channel.

Some or all of UEs 120A-N have half duplex capabilities, i.e., the UE is operative to transmit or receive data on a single frequency channel during a transmission time interval and is not operative to do both (i.e., transmit and receive at the same frequency channel and during the same transmission time interval). The uplink direction is impaired by SI whereas the downlink direction is impaired by the CCI generated by an UL UE.

BS 110 includes a UE pairing unit 112 that is operative to select a pair of UEs to be used as a DL UE and an UL UE for receiving/transmitting data during a same transmission time interval and a same frequency channel. The UE pairing unit 112 includes a machine learning predictor 114. The machine learning predictor 114 is operative to select the pair of UEs for a TTI based on a reinforcement learning mechanism. A reinforcement learning mechanism finds over time a policy, i.e., sequence of actions to be taken by an agent (e.g., BS 110), that satisfies a long-term objective. The agent, here the base station, learns a reward associated with each selected action, e.g., the selection of a pair of UEs for FD transmission during a same TTI and same frequency channel. Q-learning is an example of reinforcement learning mechanism. In some embodiments, the machine learning predictor 114 runs at the base station 110 to learn a policy for pairing UEs for FD transmission based on a state of the network in which the BS and UE are deployed. In other embodiments, the machine learning predictor 114 is operative to learn the policy for pairing the UEs for FD transmission based on other parameters and/or properties that can be independent of a state of the UEs in the network.

At operation 1, BS 110 determines DL UE 120B and UL UE 120A for a first full duplex communication during a first transmission time interval and first frequency channel, based on the machine learning predictor 114. BS 110 may further select UL UE 120C and DL UE 120D for another full duplex communication during a second transmission time interval and a second frequency channel. In one embodiment, the first frequency channel is different from the second frequency channel, and the first transmission time interval is the same as the second transmission time interval. In another embodiment, the first frequency channel is the same as the second frequency channel, and the first transmission time interval is different from the second transmission time interval. In another embodiment, the first frequency channel is different from the second frequency channel, and the first transmission time interval is different from the second transmission time interval.

Upon determination of the pair of UEs (UL UE 120A and DL UE 120B) for duplex transmission, BS 110 transmits a first scheduling grant and first configuration information to the UL UE 120A (operation 2a) and second scheduling grant and second configuration information (operation 2b) to the DL UE 120B. Following the receipt of the configuration information, the UL UE 120A transmits data to BS 110 during the first transmission time interval and on the first frequency channel. BS 110 receives (operation 4a) data from the UL UE 120A and transmits data to the DL UE 120B (operation 4b) during the first transmission time interval (at the same time) and on the first frequency channel.

FIG. 2A illustrates a block diagram of exemplary operations performed between a base station and user equipments for full duplex network communication, in accordance with some embodiments. In some embodiments, BS 110 performs UE pairing periodically. For TTI, t, the BS 110 chooses, at operation 202, a pair of UL and DL UEs to transmit and receive data, respectively. The selection of the pair of UL and DL UEs is performed by the machine learning predictor 114 as described in further detail below. In some embodiments, the network 100 is an Orthogonal Frequency Division Multiple Access (OFDMA)/Time Division Multiple Access (TDMA) network where the chosen pair gets assigned the whole bandwidth in a given TTI, t. In other words, in these embodiments, all resource blocks (RBs), e.g., a set of N consecutive RBs in frequency, are assigned to the selected DL UE and UL UE pair. An RB is the smallest unit of resources that can be allocated to a transmission in uplink and downlink. In other embodiments, different subsets of the RBs are assigned to different DL UE and UL UE pairs (i.e., multiuser OFDMA). In these embodiments, selecting the DL UE and UL UE pair further includes assigning one or more RBs to the pair at the same TTI t.

At operation 204, the base station 110 transmits a first and second scheduling grants and first and second configuration information to the UL UE 120A and to the DL UE 120B. At operation 206A, the UL UE 120A receives from the base station 110, the first scheduling grant and first configuration information. At operation 206B, the DL UE 120B receives from the base station 110, the second scheduling grant and second configuration information. At operation 208, the UL UE 120A transmits data to BS 110 during the first transmission time interval and on the first frequency channel. At operation 210, the BS 110 receives data from the UL UE 120A and transmits data to the DL UE 120B during the first transmission time interval and on the first frequency channel. At operation 212, the DL UE 120B receives data from BS 110 during the first transmission time interval and through the first frequency channel.

The determination of a pair of UEs at the base station is iteratively performed by choosing an action from a list of available actions in order to maximize a long-term gain/reward. The action is the selection of a pair of UEs for the duplex transmission. After making the selection of UE pair, BS 110 receives feedback that can be used to determine a reward for the action. The reward measures the impact of the selected action on the service offered to the UEs. In some embodiments, the reward can be determined at the UE and the feedback is the reward for the action. In other embodiments, the reward can be determined at BS 110 for the UE upon receipt of the feedback. In this embodiment, the feedback is different from the reward. Thus, after the transmission/receipt of data with a selected UE pair, e.g., DL UE 120B and UL UE 120A, the machine learning predictor 114 can be updated based on the impact of the previous action (e.g., selection of DL UE 120B and UL UE 120A). This previous action is reinforced when the use of the pair of UE resulted in satisfactory service for the UEs, otherwise the previous action is discouraged.

In some embodiments, the update of the machine learning predictor 114 can be performed according to data transmitted to the UE and acknowledgement messages received from the UE. For example, when the feature representing the state of the UE is an average data rate at Media Access Control (MAC), Radio link control (RLC) or Packet Data Convergence Protocol (PDCP) layers, the acknowledgement message can be ACK/NACK messaging in those layers. The HARQ protocol can be used to enable the receipt of ACK/NACK messages at the base station following the transmission of data to the UE. HARQ is a stop-and-wait protocol where the transmitter stops and waits for an ACK or NACK message after each transmitted transport block. LTE and NR use multiple parallel HARQ processes in order not to penalize throughput. On one hand, NR uses an asynchronous HARQ protocol in both DL and UL, that is, the HARQ process which the DL or UL transmission relates to is explicitly signaled as part of the downlink control information (DCI) that is transmitted and received in the physical downlink control channel (PDCCH). On the other hand, LTE uses asynchronous HARQ protocol in DL and synchronous HARQ in UL. In NR, multiple retransmissions are soft combined by means of incremental redundancy (IR) where the retransmitted bits are not the same as the original transmission. In DL transmissions, the scheduling assignment contains the necessary HARQ related information such as HARQ process number, new data indicator as well as information to handle the transmission of ACK/NACK in the UL such as timing and resource indication information. ACK/NACK are transmitted in UL through physical uplink control channel (PUCCH). In LTE, the time from DL data reception to transmission of ACK/NACK messages is fixed in the specifications and is about 3 ms. However, in NR, the time for ACK/NACK after reception of physical downlink shared channel (PDSCH) is dynamically specified by three-bits field in DCI. NR is designed with very low latency and is capable of transmitting the ACK/NACK much sooner than in LTE.

Figure 2B:
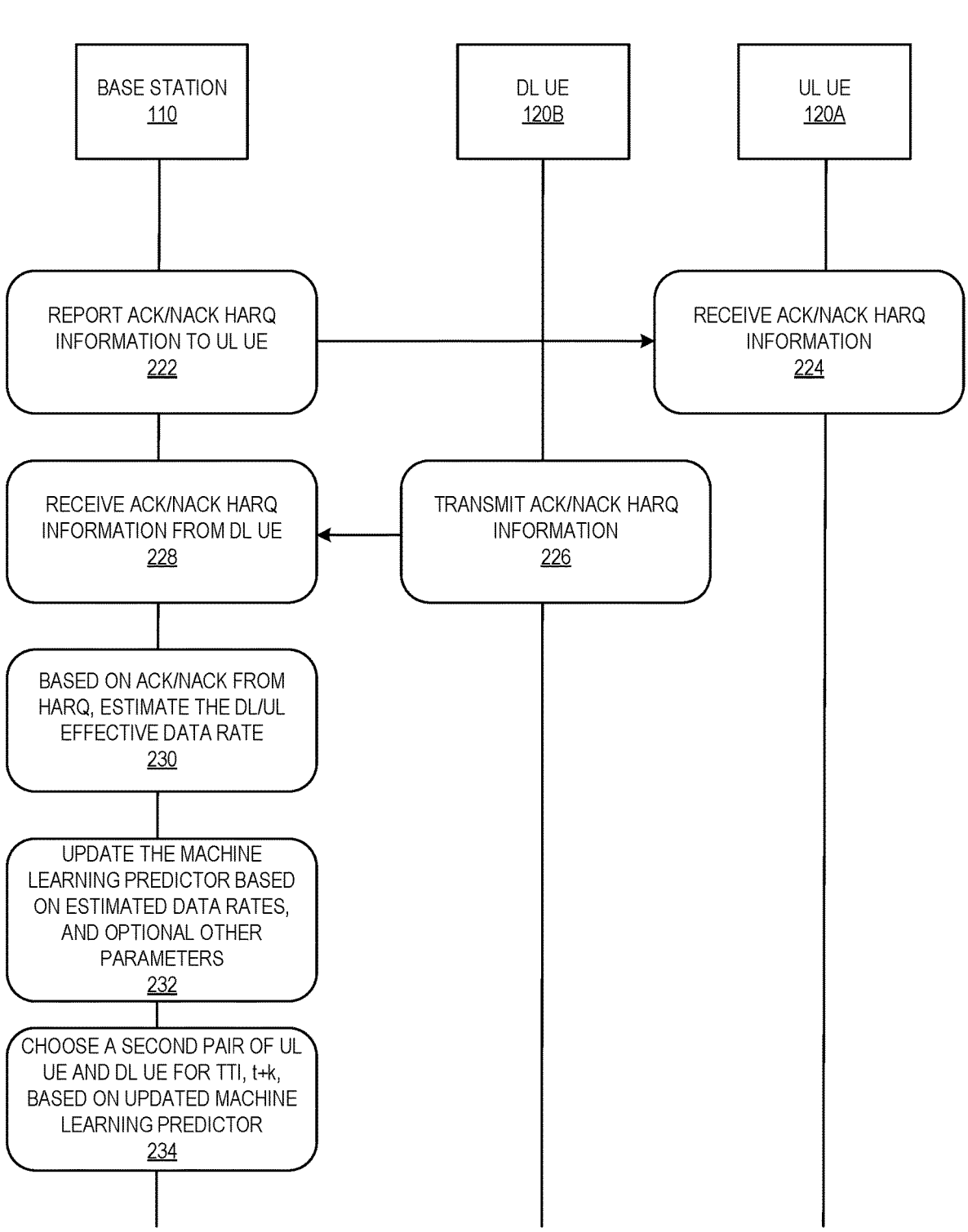
FIG. 2B illustrates a block diagram of exemplary operations performed for updating the machine learning predictor, in accordance with some embodiments.

FIG. 2B illustrates a block diagram of exemplary operations performed for updating the machine learning predictor 114, in accordance with some embodiments. At operation 222, the base station 110 reports ACK/NACK HARQ information to UL UE 120A on control channels. At operation 224, the UL UE 120A receives the ACK/NACK HARQ information from the base station 110.

At operation 226, the DL UE 120B transmits ACK/NACK HARQ information (e.g., ACK/NACK messages) after receipt of data from the base station 110. At operation 228, the base station 110 receives the ACK/NACK HARQ information (e.g., ACK/NACK messages) from the DL UE 120B.

At operation 230, the base station 110 determines or estimates effective data rates for the DL/UL UEs based on the received ACK/NACK HARQ information from both. At operation 232, the base station 110 updates the machine learning predictor 114, based on the determined or estimated effective data rates for the DL/UL UEs and, optionally, other parameters. The update of the machine learning predictor 114 can be performed as described in further detail below with respect to multiple embodiments. At operation 234, the base station 110 can use the updated machine learning predictor 114 to choose a second pair of UL/DL UEs for the next TTI, t+k. In some embodiments, the ACK/NACK configuration and messaging are performed through control channels that are different from the channels used for data transmission between the base station and the UEs.

Several implementations of the machine learning predictor 114 can be contemplated. In the multiple embodiments described herein, the machine learning predictor 114 is to perform an action of pairing UEs. The machine learning predictor 114 is further updated based on a reward for that action. The reward for the action of pairing UEs can be performed based on feedback (e.g., ACK/NACK messages) related to the transmission of data to/from the UEs. While in several embodiments described herein, the action to be performed by the machine learning predictor 114 is the selection of a pair of UEs for FD transmission, a representation of the state of the system and/or the reward for the action can vary from an embodiment to another as described in further detail below.

Machine Learning Predictor when all RBs are Assigned to a Single DL UE and UL UE Pair.

UE Pairing

In one embodiment, the objective of the machine learning predictor 114 when performing UE pairing is to maximize the number of satisfied UEs according to their average data rate requirements assuming that all RBs are assigned to a single DL UE and UL UE pair (TDMA/OFDMA). In some embodiments, the number of RBs, N, depends on the system's bandwidth.

The system state may be represented by one or a combination of features of the network 100. The features can be any one of UEs' buffer status level (e.g., the number of bits that need to be sent from BS 110 to DL UE 120B, the number of bits that need to be sent from UE 120A to BS 110), UEs' positions, UEs' power headroom (e.g., UE power headroom report (PHR) control element, as defined in 3GPP, can be used to report the power headroom available in the UE; the PHR is encoded in 6 bits with a reporting range from −23 dB to +40 dB in steps of 1 dB; positive values indicate the difference between the maximum UE transmit power and current UE transmit power), UEs' Channel State Information (CSI), UEs' Quality of Service (QoS) levels, among others. The logical channel identifier (LCID) in one of the MAC subheaders can be set to indicate the presence of the mentioned metrics.

In one embodiment, the state of the system for BS 110 at a given time is formed of individual states of the UEs (UL or DL) served by the BS 110 at the given time. As an example, the state can be represented by a binary vector (also referred to as the state vector) with length U where U represents the number of UEs served by the base station. The $u^{th}$ entry of the state vector is 1 if UE u is currently satisfied with the provided service and agreed QoS, and 0 otherwise. In another embodiment, the state of the system for BS 110 is a non-binary vector where different values for a vector entry represent different levels of a metric. For example, the value associated with a UE in the vector can represent a level of satisfaction of the UE with the provided service from a range of available values (e.g., a value from the range {0, 0.25, 0.5, 0.75, 1} etc.).

The state vector is estimated by the base station 110 based on the states of the UL and DL UEs served by the base station. The estimation of a state for the UL UE is performed based on the data received from the UE. Regarding DL UEs, the base station tracks their related state based on data transmitted to the UE and acknowledgement messages received from the UE. For example, BS 110 can track the average data rate of a DL UE at MAC, RLC, or PDCP layers by using ACK/NACK messaging in those layers.

The machine learning predictor 114 takes the state of the network for BS 110 as input and outputs one or more pairs of UEs, UL UE(s) and DL UE(s), that satisfy the policy of the machine learning predictor 114 for FD transmission. In some embodiments, the policy is defined as a database or a mapping function $Q(A, S_t)$ as described in further detail below. The mapping function maps a state of the network for BS 110 with an action from a set of all possible actions, where an action is the selection of a pair from the UEs served by the base station. The selected action is $_A Q(A, S_t)$. In some embodiments, the action to be chosen at TTI t is based on the epsilon-greedy strategy where:

$$A_t = \begin{cases} \text{argmax}_{\forall a \in \mathcal{A}}(Q(a, S_t)), & \text{with probability } \epsilon_t \\ \text{At random} & \text{with probability } 1 - \epsilon_t \end{cases} \quad (1)$$

where $\mathcal{A}$ is the set of all possible actions, i.e., all UL and DL UE pairs that can be formed based on the pairs served by the base station 110, and Et is a parameter that controls the exploration/exploitation behavior at TTI t of the reinforcement learning algorithm in the machine learning predictor 114. In some embodiments, at the beginning of a training phase of the machine learning predictor 114, Et, is set to a low value. The value of Et is continuously increased along the TTIs. Therefore, in the beginning of the training phase of the machine learning predictor 114, the reinforcement learning algorithm tends to choose multiple different actions (i.e., multiple different pairs of UEs) in order to assess multiple rewards of the chosen actions. However, as the TTIs increase, the value of Et is increased and the reinforcement learning algorithm tends to choose the actions that provide the highest long-term reward, i.e., maximizes the number of satisfied UEs.

As described above, when the UE pair is selected, the UL UE and DL UE are configured to transmit and receive data to/from BS 110. When the UEs transmit/receive data to/from BS 110, their respective states are updated to new states following the exchange of data with BS 110. Upon update of the states of the UEs, e.g., based on the effective data rate for the transmission of data during that TTI, the state of the network for BS 110 is updated. For example, when the state of the network is represented with a state vector, the entries of the vector that corresponds to the UE pair are updated.

Update of the Machine Learning Predictor

Figure 2C:
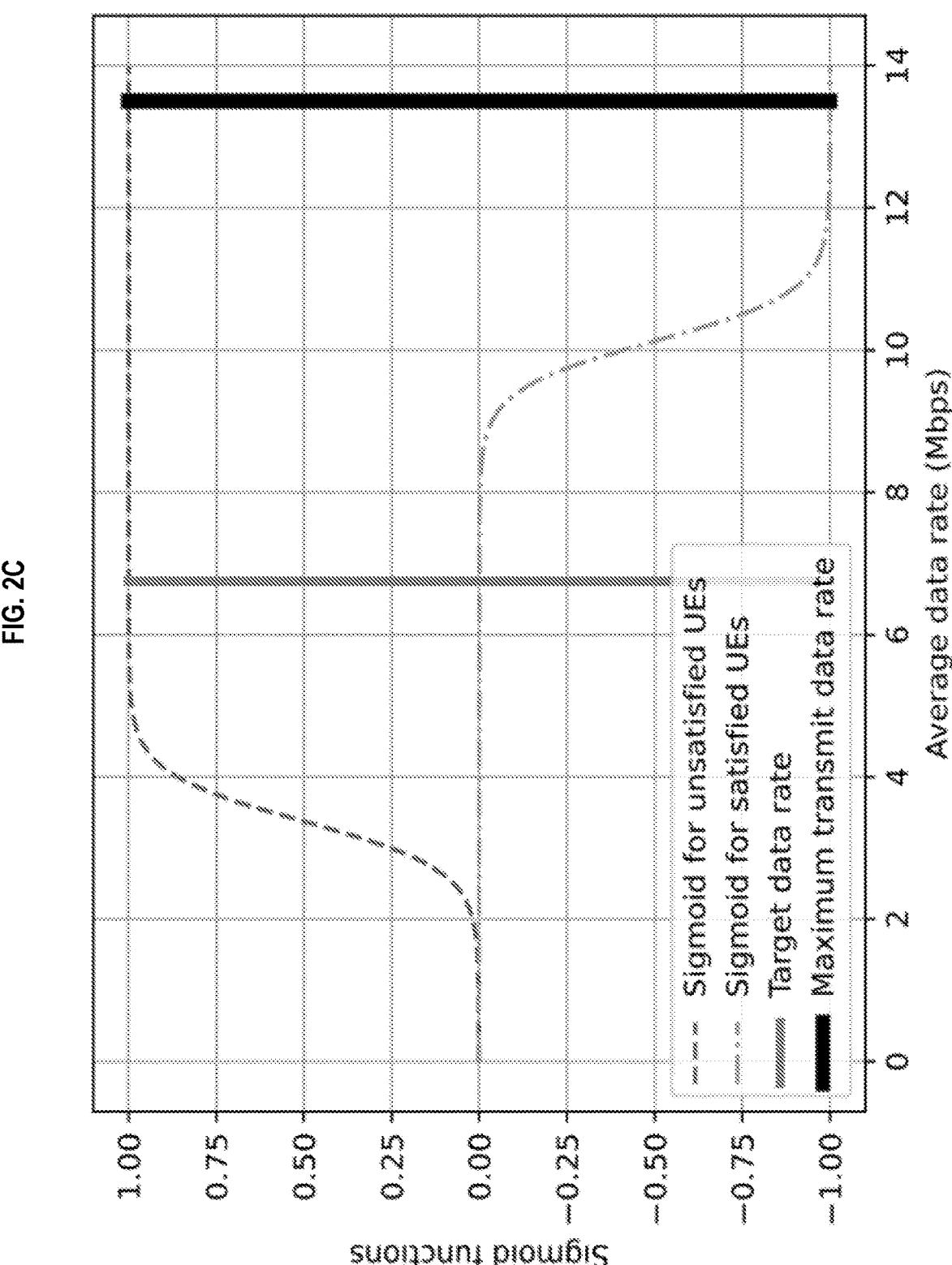
FIG. 2C illustrates an exemplary plot of sigmoid functions for satisfied and unsatisfied UEs, in accordance with some embodiments.

Upon performing the transmission/receipt of data to the selected pair of UEs (i, j), during the TTI, the base station 110 determines the reward for the action of selecting the pair (i, j) of UEs. When the overall objective of the machine learning predictor 114 is to maximize the number of satisfied UEs with a provided service (e.g., multimedia service), one example of reward for the action can be given by $U_i(R_i, R_i)+U_j(R_j, R_j)$ where $R_i$ and $R_j$ are the current average data rate or any filtered data rate of DL UE i and UL UE j (paired UEs), respectively, $R_i$ and $R_j$ are the target QoS of DL UE i and UL UE j, respectively, and $U_k(\overline{R}_k, R_k)$ is composed by sigmoid functions with the following behavior:

$$U_k(\overline{R}_k, R_k) = \begin{cases} \dfrac{1}{\left(1 + e^{-f_1 \cdot (\overline{R}_k - (R_k/2))}\right)} & \text{if } UE \ k \text{ is currently unsatisfied} \\ \dfrac{-1}{\left(1 + e^{-f_2 \cdot \left(\overline{R}_k - \frac{(R^{max} + R_k)}{2}\right)}\right)} & \text{if } UE \ k \text{ is currently satisfied} \end{cases}$$

where $$f_1 = -\log\left(\frac{(1-a_1)/(a_1)}{(R_k/2) - 1}\right), \quad f_2 = \log\left(\frac{(1-a_1)/a_1}{(R^{max}/2) - 1 - R_k/2}\right), \quad a_1$$

is a positive constant near 1 that controls the slope of the sigmoid functions and $R^{max}$ is the maximum transmit data rate to a UE in a TTI assuming that it is used the best MCS and available frequency channels (e.g., all available frequency channels). As in this example we assume that QoS of a UE k is measured in terms of average data rate, $\overline{R}_k$, a UE k is satisfied if the condition $\overline{R}_k \geq R_k$ holds in the current TTI. A plot of both sigmoid functions (for satisfied and unsatisfied UEs) is shown in FIG. 2C. While embodiments use the reward described above, this reward should be viewed as a non-limiting example of reward and other examples of rewards can be used.

$\overline{R}_i$ and $\overline{R}_j$ are updated based on, for example, the effective UL and DL received data rate and the historical data rates of the involved UEs (averages of the data rate over multiple configurations for a particular UE). The received UL data rate can be estimated by the base station based on the data received from the UL UE. The DL data rate can be estimated by the ACK/NACK messages of HARQ protocol reported by the DL UE to the base station.

Based on the reward of the selected action, the machine learning predictor 114 may update a database or a mapping function. In the next TTI, the learning algorithm chooses the action that maximizes its mapping function for the new system state that is the state of the network for BS 110 following the transmission/receipt of the data during the TTI.

In one example, the reward $U_i(\overline{R}_i, R_i)+U_j(\overline{R}_j, R_j)$ is used to update the mapping function as shown in the equation below:

$$Q(A_t, S_t) =$$
$$(1 - \alpha) \cdot Q(A_t, S_t) + \alpha \cdot \left(U_i(\overline{R_1}, R_i) + U_j(\overline{R_J}, R_j) + \gamma \cdot \max_A[Q(A, S_t)]\right)$$

where $Q(A_t, S_t)$ is the mapping function for the chosen action, $A_t$, at TTI t, and current system state at TTI t, $S_t$. The variables $\alpha$ and $\gamma$ are constants of the model and could be tuned to maximize system performance. In the next TTI, t+1, with updated system state $S_{t+1}$, the chosen action $A_{t+1}$ is selected by the machine learning predictor 114 according to equation (1) described above, where argmax outputs the argument that gives the maximum value from $Q(A, S_{t+1})$, in this case the selection of a pair DL UE, UL UE for FD transmission at the TTI t+1, that provides the maximum number of satisfied UEs during the TTI t+1.

Machine Learning Predictor when a Subset of the RBs is Assigned to the Selected UE Pair In another embodiment, the objective of the machine learning predictor 114 is to maximize the number of satisfied UEs according to average data rate requirements when each RB can be assigned to a different DL UE and UL UE pair (multiuser OFDMA). For example, in these embodiments, a subset of the set of RBs can be assigned to a first DL UE/UL UE pair and another subset of the set of RBs can be assigned to a second DL UE/UL UE pair that is different from the first UE pair. In other examples, multiple subsets of RBs can be assigned to two or more pairs of UEs. In addition to the selection of a UE pair, the machine learning predictor 114 integrates assignment of RBs to UEs.

In this embodiment, instead of selecting a UE pair for all RBs for a TTI, t, the machine learning predictor 114 chooses a UE pair for each RB, n from the set of N RBs. In this embodiment, for each RB n of a set of N RBs, the selection of the UE pair for the TTI t, is performed according to:

$$A_{t,n} = \begin{cases} \text{argmax}_{\forall a \in \mathcal{A}}(\gamma_{a,n} \cdot Q(a, S_t)), & \text{with probability } \epsilon_t \\ \text{At random} & \text{with probability } 1 - \epsilon_t \end{cases} \quad (2)$$

where $A_{t,n}$ is the action taken at TTI t for RB n, i.e., the selection of a UE pair for RB n, $S_t$ represents the state of the network (which can be determined as described above as a state vector), and $\gamma_{a,n}$ represents the channel quality estimation based on the available information at the BS of the corresponding UE pair in action a for RB n. The latter can be calculated for example as $$\gamma_{a,n} = \log\left(1 + p_{BS} \cdot \frac{g_{i,n}}{N_0}\right) + \log\left(1 + p_{UE} \cdot \frac{g_{j,n}}{N_0}\right)$$

where $p_{BS}$ and $p_{UE}$ are the transmit power of BS and UL UE, respectively, $g_{i,n}$ and $g_{j,n}$ are the estimated channel gains from BS to DL UE i and from UL UE j to BS on RB n, respectively, and $N_0$ is the noise power in the bandwidth of an RB.

The use of the term Yan enables an opportunistic behavior to the RB assignment process by providing a balance between the channel quality of each RB and the long-term reward maximization of the reinforcement learning algorithm. After transmission of the data, the rewards are updated for all selected pairs (i, j) (in each RB) based on the effective DL and UL received data rate and the historical data rates of the involved UEs (averages of the data rate over multiple configurations for a particular UE).

In this embodiment, after the exchange of data between BS 110 and the UEs, BS 110 determines a reward for the selected one or more pairs of UEs (i, j) at TTI t. The reward is defined as:

$$\left(\frac{N}{N_{i,j,t}}\right)\left(U_i(\overline{R_i}, R_i) + U_j(\overline{R_J}, R_j)\right).$$

In this embodiment, the reward includes a multiplicative factor $(N/N_{i,j,t})$, where N is the total number of RBs, and $N_{i,j,t}$ is the number of RBs assigned to the UE pair (i, j) for TTI t. The multiplicative factor decreases the effect of assigning different number of RBs to different UE pairs on the Q value used in machine learning predictor 114. The reward is then used in the machine learning predictor 114 to update the mapping function. In a non-limiting example, the mapping function can be updated as shown below:

$$Q(A_t, S_t) = (1 - \alpha) \cdot Q(A_t, S_t) +$$

$$\alpha \cdot \left(\underbrace{\left(\frac{N}{N_{i,j,t}}\right)\left(U_i(\overline{R_i}, R_i) + U_j(\overline{R_J}, R_j)\right)}_{Reward} + \gamma \cdot \max_A[Q(A, S_t)]\right)$$

In the next TTI, t+1, with updated system state $S_{t+1}$, the chosen action $A_{t+1}$ is selected by the machine learning predictor 114 according to equation (2), where argmax outputs the argument that gives the maximum value from $Q(A, S_{t+1})$, in this case the selection of a pair DL UE, UL UE for FD transmission at the TTI t+1, that provides the maximum number of satisfied UEs when each RB can be assigned to a different DL UE and UL UE pair.

Machine Learning Predictor with Objective of Maximization of Total Data Rate

In another embodiment, the objective can be the maximization of the total (uplink and downlink) data rate in the system through UE pairing where the action is the proper choice of UL and DL UEs to engage in a FD communication with the base station. In contrast to the previous embodiments where the objective of the machine learning predictor 114 is to maximize the number of satisfied UEs, in this case the mapping function of the machine learning predictor 114 does not depend on the system state; instead, it depends on the action. In this context, a stateless reinforcement algorithm within the framework of Multi Armed Bandits (MAB) can be used. The reward can be defined as $$\frac{(r_i + r_j)}{(2 \cdot R^{max})}$$

that is a real number within the interval [0, 1], where $r_i$ is the effective received data rate by DL UE i at TTI t and $r_j$ is the effective received data rate by the base station from a transmission from UL UE j at TTI t. Based on the reward, the base station updates its database or mapping function, $Q(A_t)$ for the action taken at TTI t, $A_t$, i.e., paired UEs, according to the equation below:

$$Q(A_t) = \frac{(N(t-1, A_t) \cdot Q(A_t))}{N(t, A_t)} + \frac{Q(A_t)}{N(t, A_t)}$$

where $N(t, A_t)$ consists in the number of times that the action $A_t$ was selected until TTI t assuming an evaluation interval. Finally, the choice of the next action can be in accordance with the algorithm Upper Confidence Bound (UCB) shown in the following equation:

$$A_{t+1} = \underset{A}{\mathrm{argmax}}\left[Q(A) + c \cdot \sqrt{\ln(t)/N(t, A)}\right]$$

where c is a constant of the model that should be tuned and A is the set of all actions. In this embodiment, the selection of the pair of UEs for FD transmission is independent of the state of the network for BS 110.

Machine Learning Predictor Adaptable to Different Sets of UEs

In another embodiment, the machine learning predictor 114 is operative to determine a pair of UEs for a TTI based on a state of the network for BS 110 that is independent of the UE's identification and the number of UEs in the system. This embodiment allows to generalize the use of the machine learning predictor 114 from a first set of UEs to another set of UEs that is different from the first set. In this embodiment, the state of the network for BS 110 is represented by properties of a pair of UEs, UL UE and DL UE. These properties are chosen such that different UEs with similar properties are expected to behave in a similar way in the network 100. In one non-limiting example, the properties can be related to the beams that a base station can use to serve a UE. In this example, a beam-based base station can serve UEs on different beams over the same RB. A state of the system is represented by a tuple (Bi, Ci, Bj, Cj), where Bi represents the index of the serving beam of UE i and Ci represents the channel quality indicator (CQI) of UE i when using beam Bi. The beam index can be, for example, identified using the UE precoder matrix indicator (PMI) in NR/LTE network. Additionally or alternatively, other characteristics, such as the UEs' positions, can be considered. The objective of the machine learning predictor 114 when performing UE pairing, in these embodiments, is to maximize the total transmitted data rate.

BS 110 determines a reward of action $A_t$ given state $S_t$ (in other words, reward of co-scheduling DL UE i and UL UE j for full duplex communication). The reward can be given by $U(r_i, r_j)$ where $r_i$ and $r_j$ are the effective received data rate achieved in the links involving DL UE i and UL UE j in the last exchange of data that occurred between these UEs and BS 110. $U(r_i, r_j)$ is a utility function that takes into account the data rates $r_i$ and $r_j$ of an UL and a DL UE, respectively. In a non-limiting example, it can be defined as $U(r_i, r_j) = r_i + r_j$ to maximize the total transmit data rate in the system.

In this embodiment, the mapping function between actions (selection of UE pairs) and system state is estimated by averaging samples of previous rewards, as follows:

$$Q(A_t, S_t) = (1 - \alpha) \cdot Q(A_t, S_t) + \alpha \cdot (\mathcal{R}A_t, S_t) \text{ where } 0 < \alpha < 1$$

The machine learning predictor 114 is operative to explore and exploit a search space to learn over the time which beams and CQI values (or any other considered properties) are, in average, promising for co-scheduling two UEs for full duplex communication. For example, the machine learning predictor 114 may select different beam pairs before identifying over time which pairs are best for co-scheduling two UEs for full duplex communication. In the presented example, the dimension of the search space will be based on the number of beams times the number of CQIs. The dimension of the search space is (Number of beams×Number of CQIs)×(Number of beams×Number of CQIs). The tracking/mapping of which specific pair of UEs has a suitable combination of beams and CQIs can be performed as part of a QoS control mechanism of the base station 110. When a tuple (Bi, Ci, Bj, Cj) is selected based on the mapping function of the machine learning predictor 114, a pair of UEs is automatically selected based on a predefined association between beam and UE. When the UE pair is selected and the data transmission occurs, a reward is determined by the machine learning predictor 114 for this pair and the tuple (Bi, Ci, Bj, Cj). The measured effective reward obtained for the specific selected pair considering their combination of beams and CQIs is used to update the mapping function. Updating the mapping functions causes the machine learning predictor 114 to adapt the selection of the tuple (Bi, Ci, Bj, Cj) based on the reward determined for previously selected pairs and improve the selection of the tuple and consequently of UE pairs.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 3A illustrates a flow diagram of exemplary operations performed for enabling user equipment pairing in full duplex networks using a reinforcement learning mechanism, in accordance with some embodiments. At operation 302, the base station 110 determines using a reinforcement learning mechanism, e.g., a mechanism of the machine learning predictor 114, a pair of UL UE 120A and DL UE 120B from the UEs 120A-N for respectively transmitting data to the base station 110 and receiving data from the base station at a first transmission time interval and in a first frequency channel. The reinforcement learning mechanism determines a pair of UEs according to a policy and is operative to update the policy over time as it will be discussed in further details below with respect to FIGS. 3B-C.

At operation 304, the base station 110 transmits to the UL UE 120A a first scheduling grant and first configuration information for transmitting data to the base station 110. At operation 306, BS 110 transmits to the DL UE 120B a second scheduling grant and second configuration information for receiving data from the base station 110. The flow of operations moves to operation 308, at which BS 110 receives data from the UL UE (120A) at the first transmission time interval and on the first frequency channel. At operation 310, BS 110 transmits data to the DL UE 120B at the first transmission time interval and on the first frequency channel.

FIG. 3B illustrates a flow diagram of exemplary operations performed for determining a pair of UL UE and DL UE using the reinforcement learning mechanism, in accordance with some embodiments. In some embodiments, the determination of the pair of UL UE and DL UE is performed based on a state of the communication network, operation 312. The state of the communication network may be represented by one or a combination of features of the network 100. The features can be any one of UEs buffer status level, UEs' positions, UEs' power headroom, UEs CSI, UEs' QoS levels, etc.

In one embodiment, the state of the communication network 100 for BS 110 at a given time is formed of individual states of the UEs (UL or DL) served by the BS 110 at that time. As an example, the state of the communication network 100 can be represented by a binary vector (also referred to as the state vector) with length U where U represents the number of UEs served by the base station at the time t. The $u^{th}$ entry of the state vector is 1 if UE u is currently satisfied with the provided service and agreed QoS, and 0 otherwise. In another example, the state of the system for BS 110 is a non-binary vector where different values for a vector entry represent different levels of a metric. For example, the value associated with a UE in the vector can represent a level of satisfaction of the UE with the provided service from a range of available values (e.g., a value from the range {0, 0.25, 0.5, 0.75, 1} etc.). In some embodiments, BS 110 can determine whether a UE is satisfied based on an average data rate of the UE. BS 110 can determine the average data rate of the UL UE based on the data received from the UE during previous transmissions. For example, BS 110 can determine the data rate of a UL UE at MAC, RLC, or PDCP layers based on data received from the UL UE in those layers at one or multiple transmissions and determine an average of the data rates over those transmissions. BS 110 can determine the average data rate of the DL UE based on the data transmitted to the UE during previous transmissions. For example, BS 110 can determine the data rate of a DL UE at MAC, RLC, or PDCP layers based on data transmitted to the DL UE in those layers at one or multiple transmissions and determine an average of the data rates over those transmissions. In some embodiments, the estimation of whether the DL UE is satisfied includes tracking acknowledgement messages received from the UE for data transmitted to the UE over one or multiple transmissions. Further, BS 110 can estimate the data rate of a DL UE at MAC, RLC, or PDCP layers by using ACK/NACK messaging in those layers for each transmission and determine an average of the data rates over those transmissions. Based on the determined or estimated data rate for a UE, BS 110 determines states of the UEs that are served by BS 110. The state of a UE is indicative of whether the UE is satisfied or not with the provided service. Upon determination of the state of the communication network (by determining the state of the UEs served by BS 110), BS 110 determines the UL UE/DL UE pair using a mapping function of the reinforcement learning mechanism and the state of the communication network. The mapping function maps the state of the communication network with one or more actions, where the actions include the selection of the UL UE/DL UE. In some embodiments, the mapping function is based on an objective of the reinforcement learning mechanism. In some embodiments, the objective of the reinforcement learning mechanism when performing UE pairing is to maximize the number of satisfied UEs according to their average data rate requirements. Additionally or alternatively, the objective of the reinforcement learning mechanism is to maximize the total, uplink and downlink, data rate in the system through UE pairing. The mapping function can be defined as described above based on the chosen objective of the reinforcement learning mechanism.

In some embodiments, BS 110 may determine multiple pairs. For example, BS 110 determines DL UE 120B and UL UE 120A for a first duplex communication during a first transmission time interval and first frequency channel and may determine UL UE 120C and DL UE 120D for another duplex communication during a second transmission time interval and a second frequency channel. In one embodiment, the first frequency channel is different from the second frequency channel, and the first transmission time interval is the same as the second transmission time interval. In another embodiment, the first frequency channel is the same as the second frequency channel, and the first transmission time interval is different from the second transmission time interval. In another embodiment, the first frequency channel is different from the second frequency channel, and the first transmission time interval is different from the second transmission time interval.

In other embodiments, the determination of the pair of UL UE and DL UE is independent of the state of the communication network, operation 314. For example, a stateless reinforcement algorithm within the framework of MAB can be used. The choice of the UL UE/DL UE pair can be in accordance with UCB algorithm as described above.

FIG. 3C illustrates a flow diagram of exemplary operations performed for updating a mapping function of the reinforcement learning mechanism, in accordance with some embodiments. The reinforcement learning mechanism is continuously updated in the machine learning predictor 114 upon selection of UE pairs and receipt/transmission of data to the UE pairs.

At operation 322, BS 110 determines a reward for the selected pair of UL UE 120A and DL UE 120B. The reward measures the impact of the selected action on the service offered to the UEs. In some embodiments, the reward is determined based on a data rate of the UL UE (operation 324). Additionally, the reward can be determined based on an estimate of a data rate of the DL UE (operation 326). The determination of the reward can be performed as described above according to multiple embodiments.

At operation 332, BS 110 updates a mapping function of the reinforcement learning mechanism based on the reward for the UL UE/DL UE pair. The update of the mapping function can be performed based on the determined data rate of the UL UE and the estimated data rate of the DL UE (operation 334). While embodiments herein are described with respect to the reinforcement learning mechanism being updated based on the data rates of the UEs, alternatively or additionally, the reinforcement learning can be updated based on a packet latency.

Figure 3D:
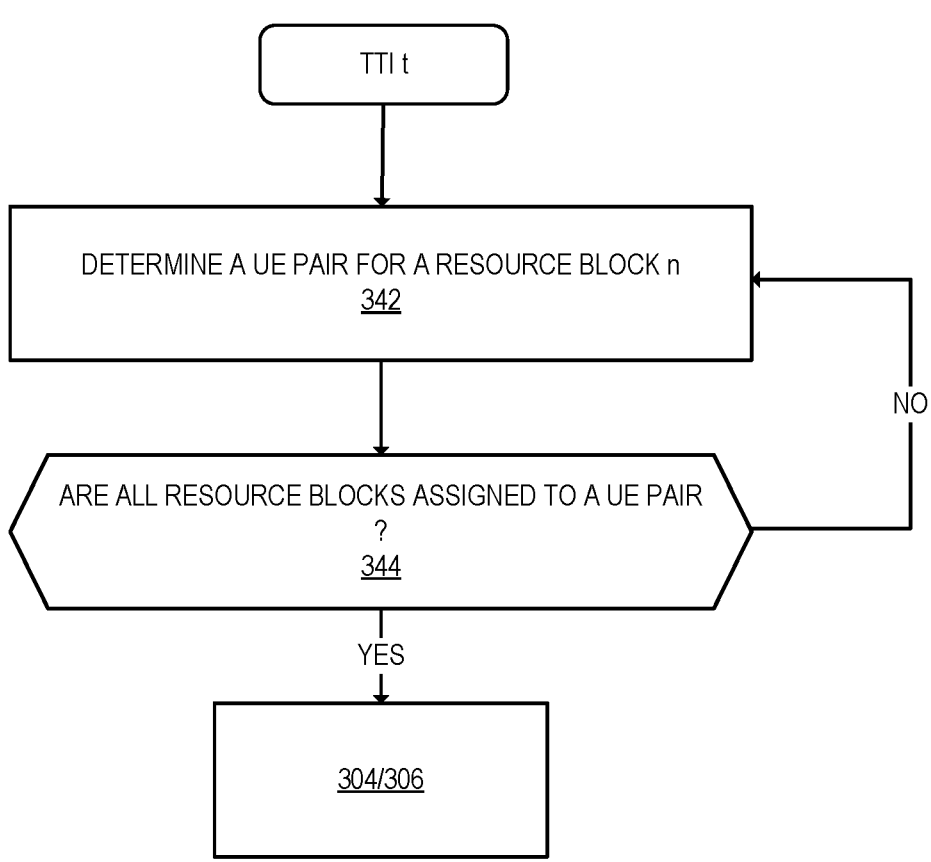
FIG. 3D illustrates a flow diagram of exemplary operations that can be performed for determining a UE pair for a resource block, in accordance with some embodiments.

FIG. 3D illustrates a flow diagram of exemplary operations that can be performed for determining a UE pair for a resource block, in accordance with some embodiments. In some embodiments, not all of the resource blocks are assigned to a single UL UE/DL UE pair. In these embodiments, at least a subset of the resource blocks that is less than all the resource blocks can be assigned to the UL UE/DL UE pair and another subset of the resource block is assigned to another UL UE/DL UE pair. In these embodiments for a TTI, t, BS 110 is operative to perform operations of FIG. 3D to assign the resource blocks to the pairs of UEs. At operation

342, a UL UE/DL UE pair is determined for a resource block n from a set of N resource blocks. In some embodiments, the determination of a UE pair can be performed as described above. The flow moves to operation 344, at which a determination of whether all of the resource blocks from the set of N resource blocks have been assigned to a UE pair. If not all of the resource blocks are assigned, operations 342 and 344 are repeated until all of the resource blocks are assigned. When it is determined that all of the resource blocks are assigned, the flow of operations move to operations 304 and 306 of FIG. 3A, at which BS 110 transmits the scheduling grants and configuration information to the UL UE and the DL UE. In some embodiments, transmitting (at operation 304) to the UL UE (120A) the first scheduling grant and the first configuration information includes transmitting an indication of one or more resources blocks from the plurality of resource blocks that are assigned to the UL UE 120A and DL UE (120B) pair; and the transmitting (at operation 306) to the DL UE 120B the second scheduling grant and second configuration information includes transmitting the indication. The scheduling grants and configuration information are sent to each pair of UEs that is selected. When multiple pairs of UEs with different subsets of RBs are selected, the grant and configuration information sent to a pair includes the indication of which RBs are assigned to the pair.

Machine Learning

While some embodiments herein have been described with a machine learning predictor implementing a machine learning mechanism of type reinforcement learning, in other embodiments, other types of machine learning can be used instead. For example, supervised learning or unsupervised learning methods can be used. Supervised learning includes machine learning mechanisms that learn a model/function based on training sets assembling examples of inputs and their expected outputs. Neural Networks (NNs) may illustrate this category. In NNs, nodes, using activation functions to perform nonlinear computation, are connected to each other by variable link weights. A training set is used to adjust the weights in order to map inputs into outputs. Unsupervised learning includes mechanisms that try to find hidden patterns without having any prior knowledge, e.g., training sets, of the output that they should come up with for each input. K-means is a well-known algorithm used in this category. It tries to find clusters only based on unlabeled input and a predefined number of clusters.

The embodiments described herein use a machine learning solution, e.g., reinforcement learning, that runs at the base station to learn the best UE pairing solutions in different situations for point-to-multipoint connections in full duplex networks. In contrast to the prior art, these embodiments do not require extra signaling between the base station and UE for the purpose of UE pairing. Moreover, the embodiments do not require that UEs transmit reference signals to other UEs with the purpose of inter-UE channel estimation. In fact, the proposed solution takes advantage of already available messages between the base station and UEs to feed the machine learning algorithm with data.

Exemplary System

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

Figure 4:
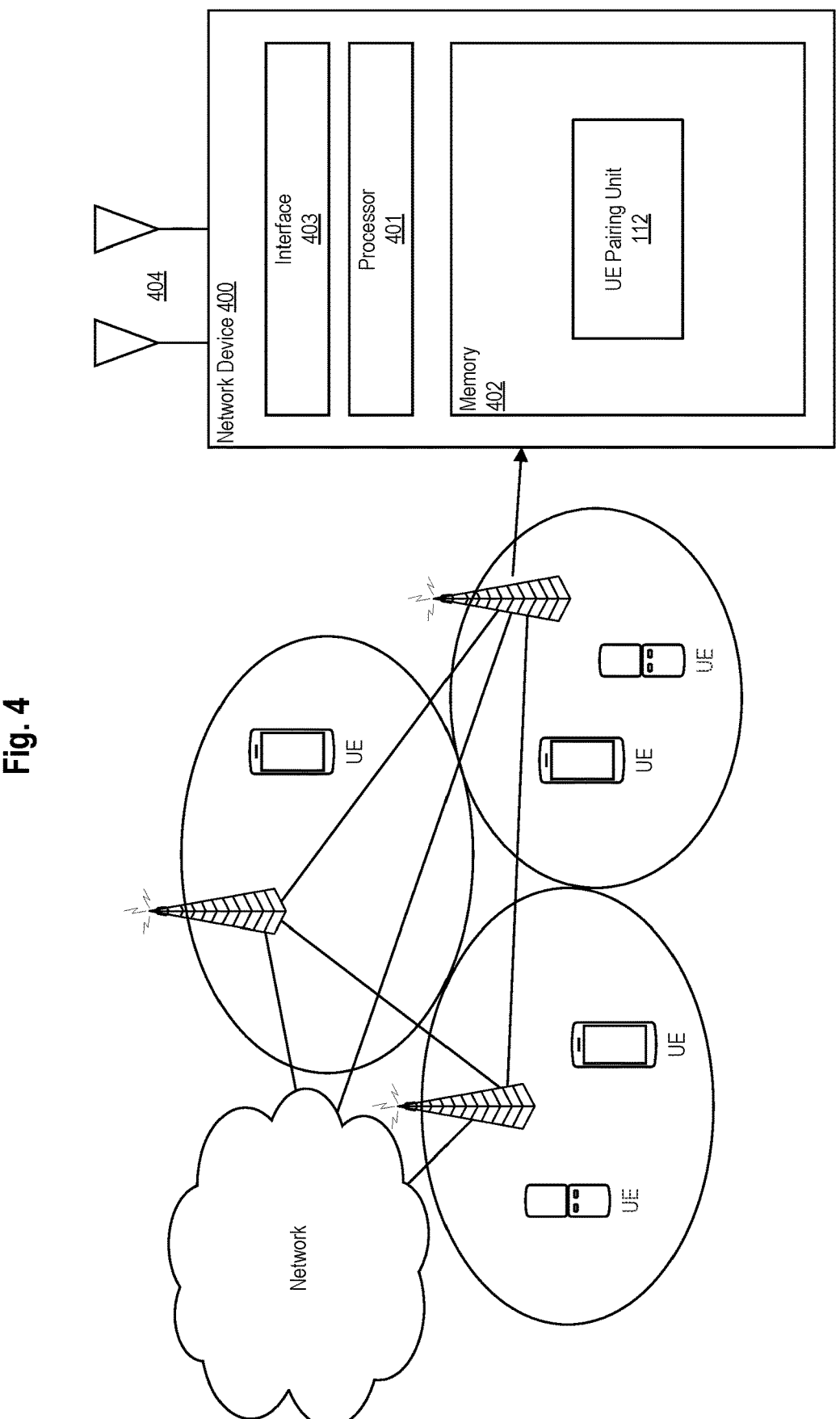
FIG. 4 illustrates one implementation example for particular embodiments of the solution described herein.

Network device (ND) 400 may, in some embodiments, be an electronic device that can be communicatively connected to other electronic devices on the network (e.g., other network devices, user equipment devices (UEs), radio base stations, etc.). In certain embodiments, network device 400 may include radio access features that provide wireless radio network access to other electronic devices (for example a "radio access network device" may refer to such a network device) such as user equipment devices (UEs). For example, network device 400 may be a base station, such as eNodeB in Long Term Evolution (LTE), NodeB in Wideband Code Division Multiple Access (WCDMA) or other types of base stations, as well as a Radio Network Controller (RNC), a Base Station Controller (BSC), or other types of control nodes. As depicted in FIG. 4, the example network device 400 comprises processor 401, memory 402, interface 403, and antenna 404. These components may work together to provide various network device functionality as disclosed herein.

Processor 401 may be a microprocessor, controller, microcontroller, central processing unit, digital signal processor, application specific integrated circuit, field programmable gate array, any other type of electronic circuitry, or any combination of one or more of the preceding. The processor 401 may comprise one or more processor cores. In particular embodiments, some or all of the functionality described herein as being provided by network device 400 may be implemented by processor 401 executing software instructions, either alone or in conjunction with other network device 400 components, such as memory 402.

Memory 402 may store code (which is composed of software instructions and which is sometimes referred to as computer program code or a computer program) and/or data using non-transitory machine-readable (e.g., computer-readable) media, such as machine-readable storage media (e.g., magnetic disks, optical disks, solid state drives, read only memory (ROM), flash memory devices, phase change memory) and machine-readable transmission media (e.g., electrical, optical, radio, acoustical or other form of propagated signals-such as carrier waves, infrared signals). For instance, memory 402 may comprise non-volatile memory containing code to be executed by processor 401. Where memory 402 is non-volatile, the code and/or data stored therein can persist even when the network device is turned off (when power is removed). In some instances, while network device 400 is turned on that part of the code that is to be executed by the processor(s) 401 may be copied from non-volatile memory into volatile memory (e.g., dynamic random access memory (DRAM), static random access memory (SRAM)) of network device 400.

Interface 403 may be used in the wired and/or wireless communication of signaling and/or data to or from network device 400. For example, interface 403 may perform any formatting, coding, or translating to allow network device 400 to send and receive data whether over a wired and/or a wireless connection. In some embodiments, interface 403 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas 404 to the appropriate recipient(s). In some embodiments, interface 403 may comprise network interface controller(s) (NICs), also known as a network interface card, network adapter, local area network (LAN) adapter or physical network interface. The NIC(s) may facilitate in connecting the network device 400 to other devices allowing them to communicate via wire through plugging in a cable to a physical port connected to a NIC. As explained above, in particular embodiments, processor 401 may represent part of interface 403, and some or all of the functionality described as being provided by interface X103 may be provided more specifically by processor 401.

The components of network device 400 are each depicted as separate boxes located within a single larger box for reasons of simplicity in describing certain aspects and features of network device 400 disclosed herein. In practice however, one or more of the components illustrated in the example network device 400 may comprise multiple different physical elements (e.g., interface 403 may comprise terminals for coupling wires for a wired connection and a radio transceiver for a wireless connection).

The solution described herein may thus be implemented in the network device 400 by means of a computer program comprising instructions which, when executed on at least one processor, cause the at least one processor to carry out the actions according to any of the above features and embodiments, where appropriate.

While the UE pairing unit 112 is illustrated as being implemented in software stored in memory 402, other embodiments implement part or all of each of these modules in hardware.

While in some embodiments, a base station or a UE can be implemented as a single network device 400, it may be the case that either device may be made of up of two or more physically or logically separate components that, taken as a whole, perform the relevant functions or features of the respective device. For example, network device 400 may comprise a base station component deployed at one location and control node component deployed at a second location. The two components together may comprise a single network device 400.

For a more thorough description of the example embodiment of network device 400 turn to FIG. 5 below.

Figure 5:
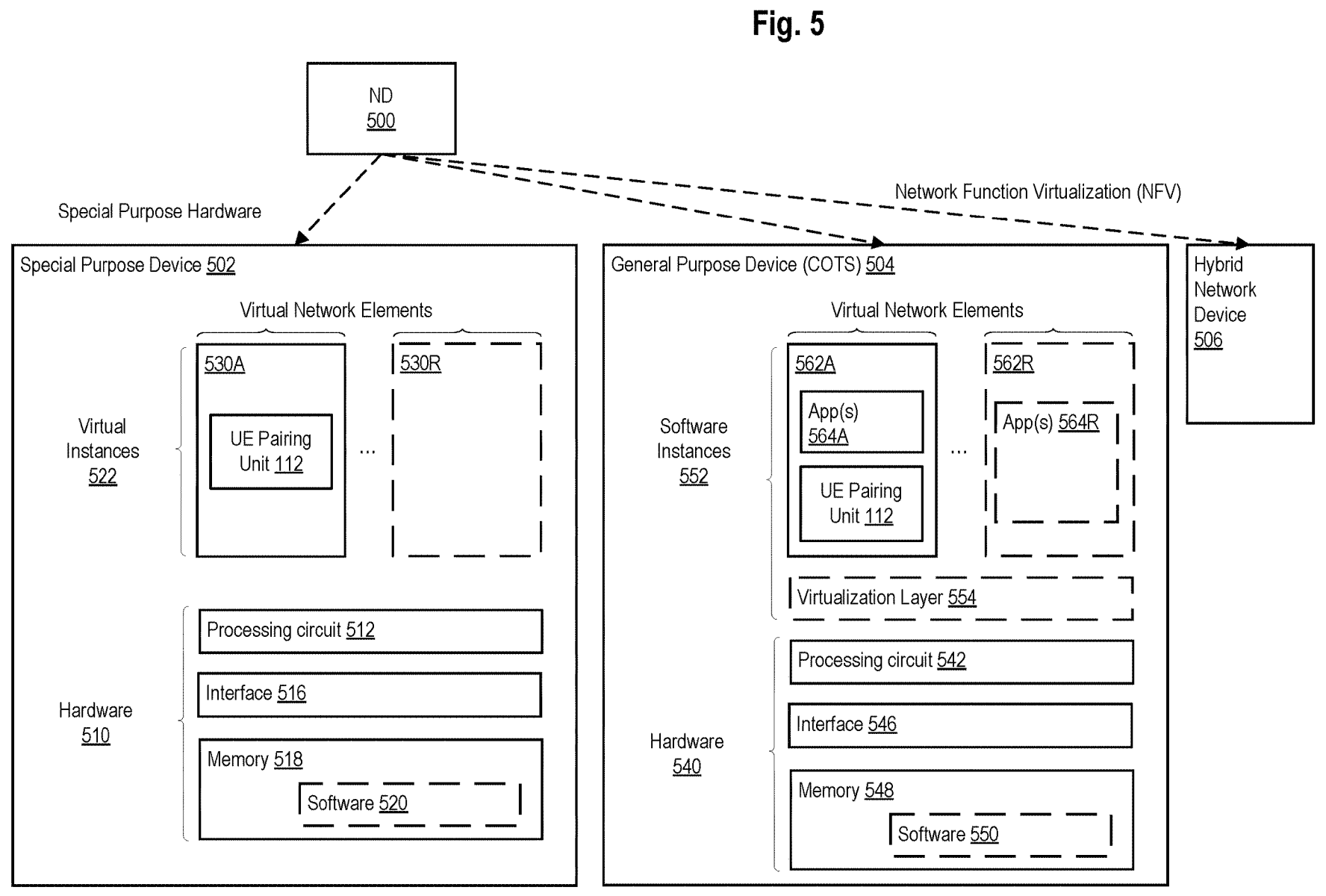

FIG. 5 illustrates two specific examples of how ND 400 may be implemented in certain embodiments of the described solution including: 1) a special-purpose network device 502 that uses custom processing circuits such as application-specific integrated circuits (ASICs) and a proprietary operating system (OS); and 2) a general purpose network device 504 that uses common off-the-shelf (COTS) processors and a standard OS which has been configured to provide one or more of the features or functions disclosed herein.

Special-purpose network device 502 includes hardware 510 comprising processor(s) 512, and interface 516, as well as memory 518 having stored therein software 520. In one embodiment, the software 520 includes a UE pairing unit 112 that implements the modules described with regard to the previous figures. During operation, the software 520 may be executed by the hardware 510 to instantiate a set of one or more software instance(s) 522. Each of the software instance(s) 522, and that part of the hardware 510 that executes that software instance (be it hardware dedicated to that software instance, hardware in which a portion of available physical resources (e.g., a processor core) is used, and/or time slices of hardware temporally shared by that software instance with others of the software instance(s) 522), form a separate virtual network element 530A-R. Thus, in the case where there are multiple virtual network elements 530A-R, each operates as one of the network devices from the preceding figures.

Returning to FIG. 5, the example general purpose network device 504 includes hardware 540 comprising a set of one or more processor(s) 542 (which are often COTS processors) and interface 546, as well as memory 548 having stored therein software 550. During operation, the processor(s) 542 execute the software 550 to instantiate one or more sets of one or more applications 564A-R. While certain embodiments do not implement virtualization, alternative embodiments may use different forms of virtualization. For example, in certain alternative embodiments virtualization layer 554 represents the kernel of an operating system (or a shim executing on a base operating system) that allows for the creation of multiple instances 562A-R called software containers that may each be used to execute one (or more)

of the sets of applications 564A-R. In this embodiment, software containers 562A-R (also called virtualization engines, virtual private servers, or jails) are user spaces (typically a virtual memory space) that may be separate from each other and separate from the kernel space in which the operating system is run. In certain embodiments, the set of applications running in a given user space, unless explicitly allowed, may be prevented from accessing the memory of the other processes. In other such alternative embodiments virtualization layer 554 may represent a hypervisor (sometimes referred to as a virtual machine monitor (VMM)) or a hypervisor executing on top of a host operating system; and each of the sets of applications 564A-R may run on top of a guest operating system within an instance 562A-R called a virtual machine (which in some cases may be considered a tightly isolated form of software container that is run by the hypervisor). In certain embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R. This virtualization of the hardware 540 is sometimes referred to as network function virtualization (NFV)). Thus, NFV may be used to consolidate many network equipment types onto industry standard high volume server hardware, physical switches, and physical storage, which could be located in for example data centers and customer premise equipment (CPE). However, different embodiments of the invention may implement one or more of the software container(s) 562A-R differently. While embodiments of the invention are illustrated with each instance 562A-R corresponding to one VNE 560A-R, alternative embodiments may implement this correspondence at a finer level granularity; it should be understood that the techniques described herein with reference to a correspondence of instances 562A-R to VNEs also apply to embodiments where such a finer level of granularity and/or unikernels are used.

The third exemplary ND implementation in FIG. 5 is a hybrid network device 506, which includes both custom ASICs/proprietary OS and COTS processors/standard OS in a single ND or a single card within an ND. In certain embodiments of such a hybrid network device, a platform virtual machine (VM), such as a VM that that implements the functionality of the special-purpose network device 502, could provide for para-virtualization to the hardware present in the hybrid network device 506.

Attached is Exhibit A, the content of which is hereby expressed incorporated herein by reference in its entirety, that described some embodiments of enabling duplex communication in a network.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

What is claimed is:

1. A method in a base station (BS) comprising:

determining using a reinforcement learning mechanism a pair of uplink user equipment (UL UE) and downlink (DL) UE from a plurality of UEs for respectively transmitting data to the BS and receiving data from the BS at a first transmission time interval and in a first frequency channel, wherein the reinforcement learning mechanism is used to determine the pair of UL UE and DL UE based on an input regarding states of UEs served by the BS, a state of a UE within the UEs representing a level of satisfaction of the UE with a service provided by the BS, wherein the level of satisfaction is based on a Quality of service (QoS) metric associated with the service;

transmitting to the UL UE a first scheduling grant and first configuration information for transmitting data to the BS; and transmitting to the DL UE a second scheduling grant and second configuration information for receiving data from the BS.

2. The method of claim 1, further comprising:

receiving data from the UL UE at the first transmission time interval and on the first frequency channel; and transmitting data to the DL UE at the first transmission time interval and on the first frequency channel.

3. The method of claim 2, further comprising:

determining, based on the data received from the UL UE and the data transmitted to the DL UE, a reward for the pair of UL UE and DL UE.

4. The method of claim 3, further comprising:

updating the reinforcement learning mechanism based on the reward for the pair of UL UE and DL UE.

5. The method of claim 3, wherein the determining, based on the data received from the UL UE and the data transmitted to the DL UE, the reward for the pair of UL UE and DL UE is based on a data rate of the UL UE and an estimate of a data rate of the DL UE.

6. The method of claim 1, wherein the determining using the reinforcement learning mechanism the pair of UL UE and DL UE is for one of a plurality of resource blocks of the first frequency channel.

7. The method of claim 6, further comprising:

prior to transmitting the first and second scheduling grants and first and second configuration information determining one or more pairs of UL UE and DL UE for remaining resource blocks of the plurality of resource blocks.

8. The method of claim 7, wherein the transmitting to the UL UE the first scheduling grant and the first configuration information includes transmitting an indication of one or more resources blocks from the plurality of resource blocks that are assigned to the pair of UL UE and DL UE-pair, and wherein the transmitting to the DL UE the second scheduling grant and second configuration information includes transmitting the indication of the one or more resources blocks from the plurality of resource blocks that are assigned to the pair of UL UE and DL UE.

9. A non-transitory machine-readable medium comprising computer program code which when executed by a computer, is capable of performing:

determining using a reinforcement learning mechanism a pair of uplink user equipment (UL UE) and downlink (DL) UE from a plurality of UEs for respectively transmitting data to a base station (BS) and receiving data from the BS at a first transmission time interval and in a first frequency channel, wherein the reinforcement learning mechanism is used to determine the pair of UL UE and DL UE based on an input regarding states of UEs served by the BS, a state of a UE within the UEs representing a level of satisfaction of the UE with a service provided by the BS, wherein the level of satisfaction is based on a Quality of service (QoS) metric associated with the service;

transmitting to the UL UE a first scheduling grant and first configuration information for transmitting data to the BS; and transmitting to the DL UE a second scheduling grant and second configuration information for receiving data from the BS.

10. A base station (BS) comprising:

a non-transitory machine-readable storage medium that provides instructions that, if executed by a processor, will cause the BS to perform operations comprising, determining using a reinforcement learning mechanism a pair of uplink user equipment (UL UE) and downlink (DL) UE from a plurality of UEs for respectively transmitting data to the BS and receiving data from the BS at a first transmission time interval and in a first frequency channel, wherein the reinforcement learning mechanism is used to determine the pair of UL UE and DL UE based on an input regarding states of UEs served by the BS, a state of a UE within the UEs representing a level of satisfaction of the UE with a service provided by the BS, wherein the level of satisfaction is based on a Quality of service (QoS) metric associated with the service, transmitting to the UL UE a first scheduling grant and first configuration information for transmitting data to the BS, and transmitting to the DL UE a second scheduling grant and second configuration information for receiving data from the BS.

11. The base station of claim 10, wherein the operations further comprise:

receiving data from the UL UE at the first transmission time interval and on the first frequency channel; and transmitting data to the DL UE at the first transmission time interval and on the first frequency channel.

12. The base station of claim 11, wherein the operations further comprise:

determining, based on the data received from the UL UE and the data transmitted to the DL UE, a reward for the pair of UL UE and DL UE.

13. The base station of claim 12, wherein the operations further comprise:

updating the reinforcement learning mechanism based on the reward for the pair of UL UE and DL UE.

14. The base station of claim 12, wherein the determining, based on the data received from the UL UE and the data transmitted to the DL UE, a reward for the pair of UL UE and DL UE is based on a data rate of the UL UE and an estimate of a data rate of the DL UE.

15. The base station of claim 10, wherein the determining using the reinforcement learning mechanism the pair of UL UE and DL UE is for one of a plurality of resource blocks of the first frequency channel.

16. The base station of claim 15, wherein the operations further comprise prior to transmitting the first and second scheduling grants and first and second configuration information:

determining one or more pairs of UL UE and DL UE for remaining resource blocks of the plurality of resource blocks.

17. The base station of claim 16, wherein the transmitting to the UL UE the first scheduling grant and the first configuration information includes transmitting an indication of one or more resources blocks from the plurality of resource blocks that are assigned to the UL UE and DL UE pair; and wherein the transmitting to the DL UE the second scheduling grant and second configuration information includes transmitting the indication of the one or more resources blocks from the plurality of resource blocks that are assigned to the pair of UL UE and DL UE.

18. The non-transitory machine-readable medium of claim 9, wherein the computer program code, when executed by the computer, is capable of further performing:

receiving data from the UL UE at the first transmission time interval and on the first frequency channel; and transmitting data to the DL UE at the first transmission time interval and on the first frequency channel.

\* \* \* \* \*